(12) United States Patent
Hayama et al.

(10) Patent No.: US 11,795,928 B2
(45) Date of Patent: **\*Oct. 24, 2023**

(54) CAPACITY CONTROL VALVE AND CAPACITY CONTROL VALVE CONTROL METHOD

(71) Applicant: EAGLE INDUSTRY CO., LTD., Tokyo (JP)

(72) Inventors: Masahiro Hayama, Tokyo (JP); Hideki Higashidozono, Tokyo (JP)

(73) Assignee: EAGLE INDUSTRY CO., LTD.

( \* ) Notice: Subject to any disclaimer, the term of this patent is extended or adjusted under 35 U.S.C. 154(b) by 0 days.

This patent is subject to a terminal disclaimer.

(21) Appl. No.: 18/074,351

(22) Filed: Dec. 2, 2022

(65) Prior Publication Data

US 2023/0097864 A1    Mar. 30, 2023

Related U.S. Application Data

(62) Division of application No. 16/763,800, filed as application No. PCT/JP2018/041768 on Nov. 12, 2018, now Pat. No. 11,542,931.

(30) Foreign Application Priority Data

Nov. 15, 2017    (JP) .................................. 2017-220521

(51) Int. Cl.
*F04B 27/18*    (2006.01)
*F16K 11/24*    (2006.01)
(Continued)

(52) U.S. Cl.
CPC ...... *F04B 27/1804* (2013.01); *F04B 53/1087* (2013.01); *F16K 11/04* (2013.01);
(Continued)

(58) Field of Classification Search
CPC .......... F04B 27/1804; F04B 2027/1854; F04B 53/1087; F04B 27/18; F04B 49/22;
(Continued)

(56) References Cited

U.S. PATENT DOCUMENTS 1,614,002 A    1/1927    Horton ................. A62C 35/605
2,267,515 A    12/1941   Wilcox ............... F16K 31/0627
(Continued)

FOREIGN PATENT DOCUMENTS

CN    111279076    6/2020    ............. F04B 27/18
CN    111316028    6/2020    ............. F16K 31/06
(Continued)

OTHER PUBLICATIONS

U.S. Appl. No. 16/480,281, filed Jul. 23, 2019, Higashidozono et al.
(Continued)

*Primary Examiner* — William M McCalister
(74) *Attorney, Agent, or Firm* — HAYES SOLOWAY P.C.

(57) ABSTRACT

A capacity control valve includes: a valve body having first communication passages, second communication passages, third communication passages, and a main valve seat; a valve element having an intermediate communication passage, a main valve portion and an auxiliary valve portion; a pressure-sensitive element disposed in the valve body; a solenoid that drives a rod; a first biasing member that biases in a valve closing direction of the main valve portion; and a second biasing member that biases in a valve opening direction of the main valve portion, wherein the rod moves relative to the valve element to press the pressure-sensitive element. The capacity control valve can efficiently discharge a liquid refrigerant and can decrease a driving force of a compressor during a liquid refrigerant discharge operation.

16 Claims, 8 Drawing Sheets

(51) Int. Cl.
  *F16K 11/04* (2006.01)
  *F16K 17/04* (2006.01)
  *F16K 31/06* (2006.01)
  *F04B 53/10* (2006.01)
  *G05D 7/00* (2006.01)

(52) U.S. Cl.
  CPC .............. *F16K 11/24* (2013.01); *F16K 17/04* (2013.01); *F16K 31/0624* (2013.01); *G05D 7/005* (2013.01); *F04B 2027/1854* (2013.01)

(58) Field of Classification Search
  CPC ...... F04B 2027/1813; F04B 2027/1818; F04B 2027/1827; F04B 2027/1831; F04B 2027/1868; F04B 2027/1881; F04B 53/1092; F16K 11/24; F16K 17/04; F16K 11/04; G05D 7/005; Y10T 137/86622; Y10T 137/86702
  USPC .......................... 137/625.65, 625.68
  See application file for complete search history.

(56) References Cited

U.S. PATENT DOCUMENTS

| | | | |
|---|---|---|---|
| 3,360,304 A | 12/1967 | Adams | B61K 7/12 |
| 3,483,888 A | 12/1969 | Hugo | F16K 15/046 |
| 4,364,615 A | 12/1982 | Euler | F16C 27/04 |
| 4,579,145 A | 4/1986 | Leiber | F16H 61/0251 |
| 4,615,358 A | 10/1986 | Hammond | F15B 13/0402 |
| 4,895,192 A | 1/1990 | Mortenson | F01M 11/04 |
| 4,917,150 A | 4/1990 | Koch | F16K 31/0606 |
| 4,979,542 A | 12/1990 | Mesenich | F02M 47/027 |
| 4,998,559 A | 3/1991 | McAuliffe | F16H 61/0251 |
| 5,060,695 A | 10/1991 | McCabe | G05D 16/2024 |
| 5,217,047 A | 6/1993 | McCabe | F16H 61/0251 |
| 5,263,694 A | 11/1993 | Smith | B60G 15/068 |
| 5,702,235 A | 12/1997 | Hirota | F04B 27/1804 |
| 5,778,932 A | 7/1998 | Alexander | G05D 16/2024 |
| 6,010,312 A | 1/2000 | Suitou | F04B 27/1804 |
| 6,161,585 A | 12/2000 | Kolchinsky | F05D 16/2024 |
| 6,361,283 B1 | 3/2002 | Ota | F04B 27/1084 |
| 6,481,976 B2 | 11/2002 | Kimura | F04B 27/1804 |
| 7,533,687 B2 | 5/2009 | Uemura | F16K 27/048 |
| 8,021,124 B2 | 9/2011 | Umemura | F04B 27/1804 |
| 8,079,827 B2 | 12/2011 | Iwa | F04B 27/1804 |
| 8,225,818 B1 | 7/2012 | Stephens | F15B 13/0442 |
| 8,651,826 B2 | 2/2014 | Futakuchi | F04B 27/1804 |
| 9,022,346 B2 | 5/2015 | Najmolhoda | F16K 31/0613 |
| 9,027,598 B2 | 5/2015 | Schneider | F16K 31/0613 |
| 9,132,714 B2 | 9/2015 | Futakuchi | F04B 27/1804 |
| 9,297,373 B2 | 3/2016 | Bagagli | F16K 15/026 |
| 9,400,027 B2 | 7/2016 | Imaizumi | F16F 1/32 |
| 9,453,518 B2 | 9/2016 | Schulz | F15B 13/043 |
| 9,581,149 B2 | 2/2017 | Ota et al. | F04B 27/1804 |
| 9,581,150 B2 | 2/2017 | Ota et al. | F04B 27/1804 |
| 9,732,874 B2 | 8/2017 | Saeki | F16K 31/0603 |
| 9,874,286 B2 | 1/2018 | Bagagli | F16K 15/12 |
| 10,113,539 B2 | 10/2018 | Sugamura | F04B 27/1804 |
| 10,519,944 B2 | 12/2019 | Taguchi | F04B 27/1804 |
| 10,557,463 B2 | 2/2020 | Sugamura | F04B 27/1804 |
| 10,690,125 B2 | 6/2020 | Hayama | F04B 27/18 |
| 10,784,804 B2 | 9/2020 | Sasaki | H02P 25/022 |
| 10,837,431 B2 | 11/2020 | Tonegawa | F04B 49/22 |
| 2001/0003573 A1 | 6/2001 | Kimura et al. | 417/222.2 |
| 2002/0134444 A1 | 9/2002 | Isobe | F16K 27/041 |
| 2003/0145615 A1 | 8/2003 | Sasaki | F16K 31/0637 |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | F16K 31/0624 |
| 2005/0151310 A1 | 7/2005 | Rodeffer | F16F 1/32 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1 | 7/2009 | Iwa | 137/487.5 |
| 2009/0256091 A1 | 10/2009 | Nordstrom | F16K 31/0613 |
| 2010/0282991 A1 | 11/2010 | Okamoto | F16K 31/02 |
| 2011/0061749 A1 | 3/2011 | Okamoto | F16K 31/0655 |
| 2011/0089352 A1 | 4/2011 | Morgan | F16K 11/0716 |
| 2012/0056113 A1 | 3/2012 | Tano | F04B 27/1804 |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | F16K 31/0655 |
| 2013/0291963 A1 | 11/2013 | Futakuchi et al. | 137/487.5 |
| 2014/0099214 A1 | 4/2014 | Fukudome | 417/222.2 |
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0345655 A1 | 12/2015 | Higashidozono | 137/624.27 |
| 2016/0053755 A1 | 2/2016 | Taguchi | F04B 49/22 |
| 2016/0290326 A1 | 10/2016 | Sugamura | F04B 27/1804 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0291888 A1 | 10/2018 | Tonegawa et al. | F04B 49/22 |
| 2019/0162175 A1 | 5/2019 | Higashidozono | F04B 27/18 |
| 2020/0032781 A1 | 1/2020 | Higashidozono | F16K 31/0624 |
| 2020/0309105 A1 | 10/2020 | Hayama et al. | F04B 27/18 |
| 2020/0318624 A1 | 10/2020 | Hayama | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |

FOREIGN PATENT DOCUMENTS

| | | | |
|---|---|---|---|
| CN | 111417780 | 7/2020 | F04B 27/18 |
| EP | 2594794 | 5/2013 | F04B 27/18 |
| EP | 3726054 | 10/2020 | F04B 27/18 |
| JP | 6-26454 | 2/1994 | F04B 27/08 |
| JP | 2001165055 | 6/2001 | F04B 27/14 |
| JP | 2004003468 | 1/2004 | F04B 27/14 |
| JP | 2005307817 | 11/2005 | F04B 27/14 |
| JP | 2007247512 | 9/2007 | F04B 27/14 |
| JP | 2008157031 | 7/2008 | F04B 27/14 |
| JP | 2009275550 | 11/2009 | F04B 49/00 |
| JP | 2012144986 | 8/2012 | F04B 27/14 |
| JP | 2012211579 | 11/2012 | F04B 27/14 |
| JP | 5167121 | 3/2013 | F04B 27/14 |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 201575054 | 4/2015 | F04B 27/14 |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 5983539 | 8/2016 | F04B 27/18 |
| JP | 2016196825 | 11/2016 | F04B 27/18 |
| JP | 2016196876 | 11/2016 | F04B 27/18 |
| JP | 2016205404 | 12/2016 | F04B 27/18 |
| JP | 6135521 | 5/2017 | F04B 27/18 |
| JP | 2017089832 | 5/2017 | F16K 31/06 |
| JP | 2018179087 | 11/2018 | F16K 31/06 |
| KR | 10-2016-0074449 | 6/2016 | F16K 11/16 |
| WO | WO2006090760 | 8/2006 | F04B 27/18 |
| WO | WO2007119380 | 10/2007 | F04B 27/14 |
| WO | WO2009025298 | 2/2009 | F16K 31/06 |
| WO | WO2011114841 | 9/2011 | F04B 27/14 |
| WO | WO2012077439 | 6/2012 | F04B 27/14 |

(56) References Cited

FOREIGN PATENT DOCUMENTS

| WO | WO2014119594 | 8/2014 | ............ F04B 27/14 |
| WO | WO2014148367 | 9/2014 | ............ F16K 31/06 |

OTHER PUBLICATIONS

U.S. Appl. No. 16/483,621, filed Aug. 5, 2019, Higashidozono et al.
U.S. Appl. No. 16/763,800, filed May 13, 2020, Hayama et al.
U.S. Appl. No. 16/766,096, filed May 21, 2020, Kurihara et al.
U.S. Appl. No. 16/957,340, filed Jun. 23, 2020, Hayama et al.
U.S. Appl. No. 16/957,344, filed Jun. 23, 2020, Hayama et al.
U.S. Appl. No. 16/961,620, filed Jul. 10, 2020, Hayama et al.
U.S. Appl. No. 17/293,435, filed May 12, 2021, Hayama et al.
U.S. Appl. No. 16/772,703, filed Jun. 12, 2020, Hayama et al.
U.S. Appl. No. 14/431,270, filed Mar. 25, 2015, Higashidozono et al.
The First Office Action issued in Chinese Patent Appln. Serial No. 201880081296.0, dated Jul. 5, 2021, with English translation, 9 pages.
Extended European Search Report issued in European Patent Appln. Serial No. 18896700.4, dated Aug. 12, 2021, 8 pages.
European Official Action issued in related European Patent Application Serial No. 18885296.6, dated Jan. 21, 2022, 4 pages.
European Official Action issued in related European Patent Application Serial No. 18897846.4, dated Apr. 14, 2022 (5 pgs).
European Official Action issued in related European Patent Application Serial No. 19890548.1, dated May 24, 2022 (6 pgs).
European Official Action issued in related European Patent Application Serial No. 18884020.1, dated Jun. 28, 2022 (4 pgs).
Korean Official Action issued in related Korean Patent Application Serial No. 10-2020-7013914, dated Mar. 15, 2022 (5 pgs).
Chinese Office Action issued in Chinese Patent Appln. Serial No. 201880080867.9, dated Mar. 16, 2022, with English translation, 13 pages.
Chinese Office Action issued in Chinese Patent Appln. Serial No. 201880072030.X, dated Jun. 6, 2022, with English translation, 12 pages.
Chinese Office Action issued in Chinese Patent Appln. Serial No. 201980075007.0, dated Jun. 6, 2022, with English translation, 8 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
Japanese Office Action issued in Japanese Patent Appln. Serial No. 2019-559188, dated Jul. 13, 2022, with English translation, 9 pages.
International Preliminary Report on Patentability issued in PCT/JP2018/047716, dated Jun. 30, 2020, 8 pages.
International Search Report and Written Opinion issued in PCT/JP2018/047716, dated Mar. 26, 2019, with English translation, 14 pages.
International Preliminary Report on Patentability issued in PCT/JP2014/051901, dated Aug. 13, 2015, 7 pages.
International Search Report issued in PCT/JP2014/051901, dated Apr. 18, 2014, 4 pages.
International Preliminary Report on Patentability, International Search Report and Written Opinion issued in PCT/JP2019/045731, dated Feb. 4, 2020, 21 pages.
International Search Report issued in PCT/JP2018/004500, dated May 15, 2018, 12 pages.
International Preliminary Report on Patentability issued in PCT/JP2018/004500, dated Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search Report issued in PCT/JP2019/001569, dated Apr. 16, 2019, 20 pages.
International Preliminary Report on Patentability issued in PCT/JP2019/001569, dated Oct. 15, 2018, 7pages.
International Search Report and Written Opinion with translation issued in PCT/JP2019/001570, dated Jul. 25, 2019 (19 pages).
International Preliminary Report on Patentability with translation issued in PCT/JP2019/001570, dated Jul. 28, 2020 (6 pages).
International Search Report and Written Opinion with translation issued in PCT/JP2018/043652, dated Feb. 19, 2019 (21 pages).
International Preliminary Report on Patentability with translation issued in PCT/JP2018/043652, dated Jun. 2, 2020 (7 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Official Action issued in related U.S. Appl. No. 16/957,340, dated Feb. 4, 2022 (18 pgs).
Official Action issued in related U.S. Appl. No. 16/957,340, dated Sep. 20, 2021 (18 pgs).
Notice of Allowance issued in related U.S. Appl. No. 16/961,620, dated Feb. 9, 2022 (6 pgs).
Notice of Allowance issued in related U.S. Appl. No. 16/772,703, dated Oct. 13, 2021 (5 pgs).
Official Action issued in related U.S. Appl. No. 16/772,703, dated Jul. 21, 2021 (6 pgs).
Official Action issued in related U.S. Appl. No. 16/961,620, dated Aug. 5, 2021 (7 pgs).
Official Action issued in related U.S. Appl. No. 17/293,435, dated Nov. 23, 2021 (12 pgs).
Official Action issued in related U.S. Appl. No. 17/293,435, dated May 31, 2022 (11 pgs).
Official Action issued in related U.S. Appl. No. 16/961,627, dated Oct. 26, 2021 (24 pgs).
Official Action issued in related U.S. Appl. No. 16/766,124, dated Oct. 27, 2021 (11 pgs).
Notice of Allowance issued in related U.S. Appl. No. 16/766,124, dated Apr. 4, 2022 (5 pgs).
Notice of Allowance issued in related U.S. Appl. No. 16/957,340, dated May 24, 2022 (16 pgs).
Notice of Allowance issued in related U.S. Appl. No. 16/961,627, dated May 5, 2022 (19 pgs).
Official Action issued in related U.S. Appl. No. 16/957,344, dated Mar. 29, 2022 (19 pgs).
Official Action issued in related U.S. Appl. No. 16/763,800, dated Jun. 8, 2022 (9 pgs).
Official Action issued in related U.S. Appl. No. 16/480,281, dated Jun. 8, 2022 (15 pgs).
Official Action issued in related U.S. Appl. No. 16/766,096, dated May 27, 2022 (7 pgs).
Official Action issued in related U.S. Appl. No. 16/771,548, dated Dec. 8, 2021 (15 pgs).
Official Action issued in related U.S. Appl. No. 16/771,548, dated Jun. 7, 2022 (11 pgs).
Official Action issued in related U.S. Appl. No. 16/483,621, dated Jun. 17, 2022 (13 pgs).

(56) References Cited

OTHER PUBLICATIONS

Korean Official Action issued in related Korean Patent Application Serial No. 10-2021-7015431, dated Jan. 30, 2023 (13 pgs) with translation.

CAPACITY CONTROL VALVE AND CAPACITY CONTROL VALVE CONTROL METHOD

CROSS-REFERENCE TO RELATED APPLICATIONS

This application is a divisional application of U.S. patent application Ser. No. 16/763,800, filed May 13, 2020, which in turn is a U.S. National Phase under 35 U.S.C. § 371 of International Application PCT/JP2018/041768, filed Nov. 12, 2018, which claims priority to Japanese Patent Application No. 2017-220521, filed Nov. 15, 2017. The contents of which are incorporated herein by reference.

TECHNICAL FIELD

The present invention relates to a capacity control valve suitable for controlling a flow rate or a pressure of a variable capacity compressor and a method of controlling the capacity control valve.

BACKGROUND ART

As a variable capacity compressor, for example, a swash plate type variable capacity compressor suitable for an air-conditioning system of an automobile or the like includes a rotating shaft rotationally driven by a rotational force of an engine, a swash plate coupled to the rotating shaft such that the plate's angle of inclination can be varied, a piston for compression coupled to the swash plate, and the like. By varying the angle of inclination of the swash plate to vary the stroke of the piston, the compressor controls the discharge rate of a refrigerant.

The angle of inclination of the swash plate can be continuously varied by utilizing a suction pressure in a suction chamber for drawing in the refrigerant, a discharge pressure in a discharge chamber for discharging the refrigerant pressurized by the piston, and a control chamber pressure in a control chamber (a crank chamber) in which the swash plate is housed, while appropriately controlling the pressure in the control chamber using a capacity control valve that is driven to be opened and closed by an electromagnetic force, and thereby regulating the balance of pressures acting on opposite faces of the piston.

FIG. 7 shows an example of such a capacity control valve. A capacity control valve 160 includes: a valve unit 170 having a second valve chest 182 communicating with a discharge chamber of a compressor through a second communication passage 173, a first valve chest 183 communicating with a suction chamber through a first communication passage 171, and a third valve chest 184 communicating with a control chamber through a third communication passage 174; a pressure-sensitive element 178 that is arranged in the third valve chest to extend and contract with an ambient pressure and has a valve seat element 180 provided at free end in a direction of extension and contracting; a valve element 181 having a second valve portion 176 that opens and closes a valve hole 177 communicating the second valve chest 182 and the third valve chest 184, a first valve portion 175 that opens and closes the first communication passage 171 and a flow channel 172, and a third valve portion 179 that opens and closes the third valve chest 184 and the flow channel 172 by being engaged with and disengaged from the valve seat element 180 in the third valve chest 184; a solenoid unit 190 that exerts an electromagnetic driving force on the valve element 181; and others.

Furthermore, even though a clutch mechanism is not provided in the variable capacity compressor, in a case where it becomes necessary to vary the control chamber pressure, the capacity control valve 160 can control a pressure Pc in the control chamber (a control chamber pressure) and a suction pressure Ps (a suction pressure) by making the discharge chamber and the control chamber communicate with each other (hereinafter referred to as a "conventional art". See, for example, Patent Document 1).

CITATION LIST

Patent Document

Patent Document 1: JP 5167121 B1

SUMMARY OF THE INVENTION

Problem to be Solved by the Invention

In the conventional art, in a case where the swash plate type variable capacity compressor is stopped for a long period of time, a liquid refrigerant (a refrigerant that has been liquefied by cooling while the compressor is inoperative) accumulates in the control chamber (the crank chamber). If the compressor is activated in this state, the preset discharge rate cannot be ensured. Therefore, in order for the desired capacity control to be performed immediately after the activation, it is necessary for the liquid refrigerant in the control chamber (the crank chamber) to be discharged as quickly as possible.

Therefore, as shown in FIG. 8, the conventional capacity control valve 160 is provided with a liquid refrigerant discharge function to discharge the liquid refrigerant in the control chamber (the crank chamber) as quickly as possible at the time of activation. That is, in a case where the variable capacity compressor has been stopped, left inoperative for a long period of time, and is then activated, the high-pressure liquid refrigerant accumulated in the control chamber (the crank chamber) flows through the third communication passage 174 into the third valve chest 184. Then, the pressure-sensitive element (the bellows) 178 contracts, and a gap opens between the third valve portion 179 and the valve seat element 180. From the third valve chest 184 through an auxiliary communication passage 185, a communication passage 186, and the flow channel 172, the liquid refrigerant is discharged from the control chamber (the crank chamber) through the suction chamber to the discharge chamber to be rapidly vaporized, enabling the compressor to be brought into a cooling operation in a short time.

However, in the above conventional art, in the early stage of the liquid refrigerant discharging process, the pressure in the control chamber is high, so that the opening of the third valve portion 179 is large and the liquid refrigerant can be discharged efficiently. Unfortunately, as the discharge of the liquid refrigerant progresses and the pressure in the control chamber decreases, the opening of the third valve body becomes smaller, requiring time to discharge the liquid refrigerant.

Conventionally, during the liquid refrigerant discharge operation, attention has been focused only on how to complete the discharge of the liquid refrigerant in a short time, and thus the control for reducing the engine load during the liquid refrigerant discharge operation has not been performed. However, if the liquid refrigerant discharge operation is performed when the engine load is high, the engine load further increases, resulting in a decrease in energy efficiency of the entire automobile.

The present invention has been made in order to solve the problems of the conventional art, and its object is to provide a capacity control valve that controls a flow rate or a pressure of a variable capacity compressor according to a valve opening of a valve unit, in which a liquid refrigerant can be efficiently discharged regardless of a pressure in a suction chamber to shift the compressor to a cooling operation in a short time and a driving force of the compressor can be decreased during a liquid refrigerant discharge operation, and a method of controlling the capacity control valve.

Means for Solving Problem

In order to solve the above problems, a capacity control valve according to a first aspect of the present invention that controls a flow rate or a pressure of a variable capacity compressor according to a valve opening of a valve unit, is characterized by including:

a valve body including first communication passages that pass fluid under a first pressure, second communication passages that are arranged adjacent to the first communication passages and pass fluid under a second pressure, third communication passages that pass fluid under a third pressure, and a main valve seat that is disposed in a valve hole communicating the second communication passages and the third communication passages;

a pressure-sensitive element that is arranged in the valve body on the side of the third communication passages and extends and contracts in response to an ambient pressure;

a valve element including an intermediate communication passage that communicates the first communication passages and the third communication passages, a main valve portion that is separated from and comes into contact with the main valve seat to open and close the valve hole, and an auxiliary valve portion that is separated from and comes into contact with the pressure-sensitive element to open and close the intermediate communication passage;

a solenoid that drives a rod;

a first biasing member that biases in a valve closing direction of the main valve portion; and a second biasing member that biases in the valve opening direction of the main valve portion, wherein the rod moves relative to the valve element to press the pressure-sensitive element.

According to this aspect, the rod can be moved relative to the valve element to press the pressure-sensitive element, allowing the auxiliary valve portion to be forcibly opened, so that an opening of the auxiliary valve portion can be kept in the fully open state from the start of the liquid refrigerant discharge to the completion of the liquid refrigerant discharge, and the liquid refrigerant can be efficiently discharged.

The capacity control valve according to a second aspect of the present invention is characterized in that a biasing force of the second biasing member is larger than a biasing force of the first biasing member.

According to this aspect, even when the biasing force of the pressure-sensitive element does not act on the valve element, the main valve portion can be opened by the biasing force of the second biasing member, and the main valve portion and the auxiliary valve portion can be opened and closed in any combination.

The capacity control valve according to a third aspect of the present invention is characterized in that the first biasing member is disposed between the solenoid and the valve element.

According to this aspect, since the first biasing member is disposed between the solenoid and the valve element, it is possible to ensure that the valve element is biased in the valve closing direction of the main valve portion.

The capacity control valve according to a fourth aspect of the present invention is characterized in that the second biasing member is disposed between the pressure-sensitive element and the rod.

According to this aspect, since the second biasing member is disposed between the pressure-sensitive element and the rod, it is possible to ensure that the valve element is biased in the valve opening direction of the main valve portion.

The capacity control valve according to a fifth aspect of the present invention is characterized in that the solenoid further includes a plunger connected to the rod, a core arranged between the plunger and the valve body, and an electromagnetic coil, and the second biasing member is disposed between the plunger and the core.

According to this aspect, since the second biasing member is disposed between the plunger and the core, it is possible to ensure that the valve element is biased in the valve opening direction of the main valve portion when the solenoid is turned off.

The capacity control valve according to a sixth aspect of the present invention is characterized in that the rod includes a locking portion that is separated from and comes contact with the valve element.

According to this aspect, the locking portion provided in the rod comes into contact with the valve element and moves integrally with the valve element to open and close the main valve portion, and the locking portion is separated from the valve element, and the rod and the valve element move relative to each other to press the sensitive element, allowing the auxiliary valve portion to be opened, so that one rod can open and close different valves.

The capacity control valve according to a seventh aspect of the present invention is characterized in that the rod includes a pressing portion that presses the pressure-sensitive element.

According to this aspect, the pressure-sensitive element is reliably pressed by the pressing portion of the rod to allow the liquid refrigerant to be efficiently discharged regardless of the pressure in the suction chamber, so that the compressor can be brought into the cooling operation in a short time.

The capacity control valve according to an eighth aspect of the present invention is characterized in that the first pressure is a suction pressure of the variable capacity compressor, the second pressure is a discharge pressure of the variable capacity compressor, and the third pressure is a pressure in a crank chamber of the variable capacity compressor, or the first pressure is a pressure in a crank chamber of the variable capacity compressor, the second pressure is a discharge pressure of the variable capacity compressor, and the third pressure is a suction pressure of the variable capacity compressor.

According to this aspect, the present invention can be applied to various variable capacity compressors.

In order to solve the above problems, a method of controlling a capacity control valve according to a ninth aspect of the present invention is characterized by comprising when the auxiliary valve portion is in an open state, bringing the main valve portion from a closed state into an open state.

According to this aspect, the main valve portion is opened with no biasing force of the pressure-sensitive element acting on the valve element during the liquid refrigerant discharge, causing the flow rate from the discharge chamber to the control chamber to increase and causing the load on the compressor to be reduced.

DESCRIPTION OF EMBODIMENTS

Hereinafter with reference to the drawings, a mode for carrying out the present invention will be described illustratively based on embodiments. However, the dimensions, materials, shapes, relative positions, and others of components described in the embodiments are not intended to limit the present invention only to them unless otherwise explicitly described.

First Embodiment

Figure 1:
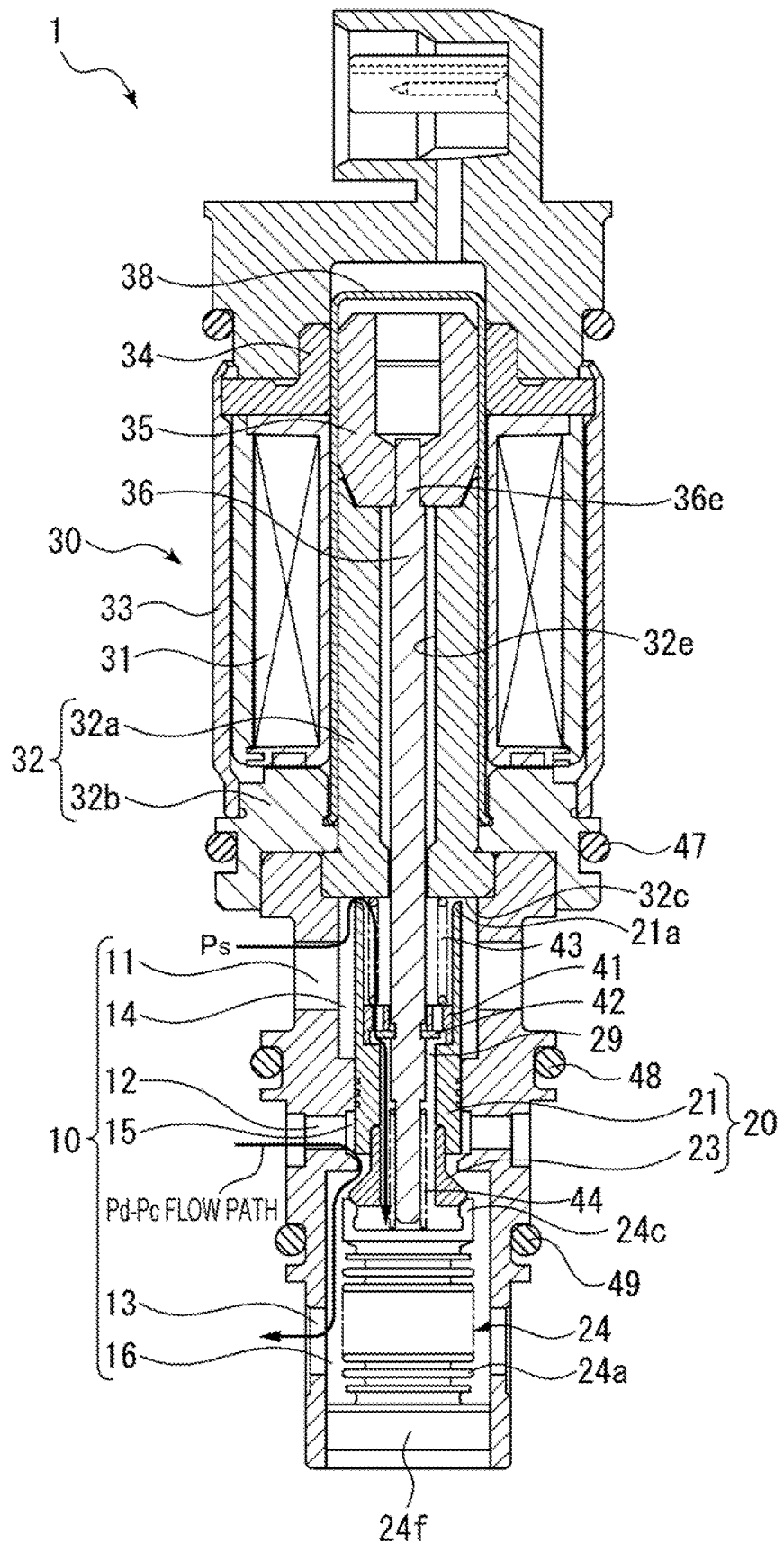
FIG. 1 is a front sectional view showing a capacity control valve according to a first embodiment of the present invention, and shows a control state of the capacity control valve when a third valve chest is under a low pressure, a solenoid is in an ON state, a main valve is brought into an open state, and an auxiliary valve is brought into a closed state.
Figure 2:
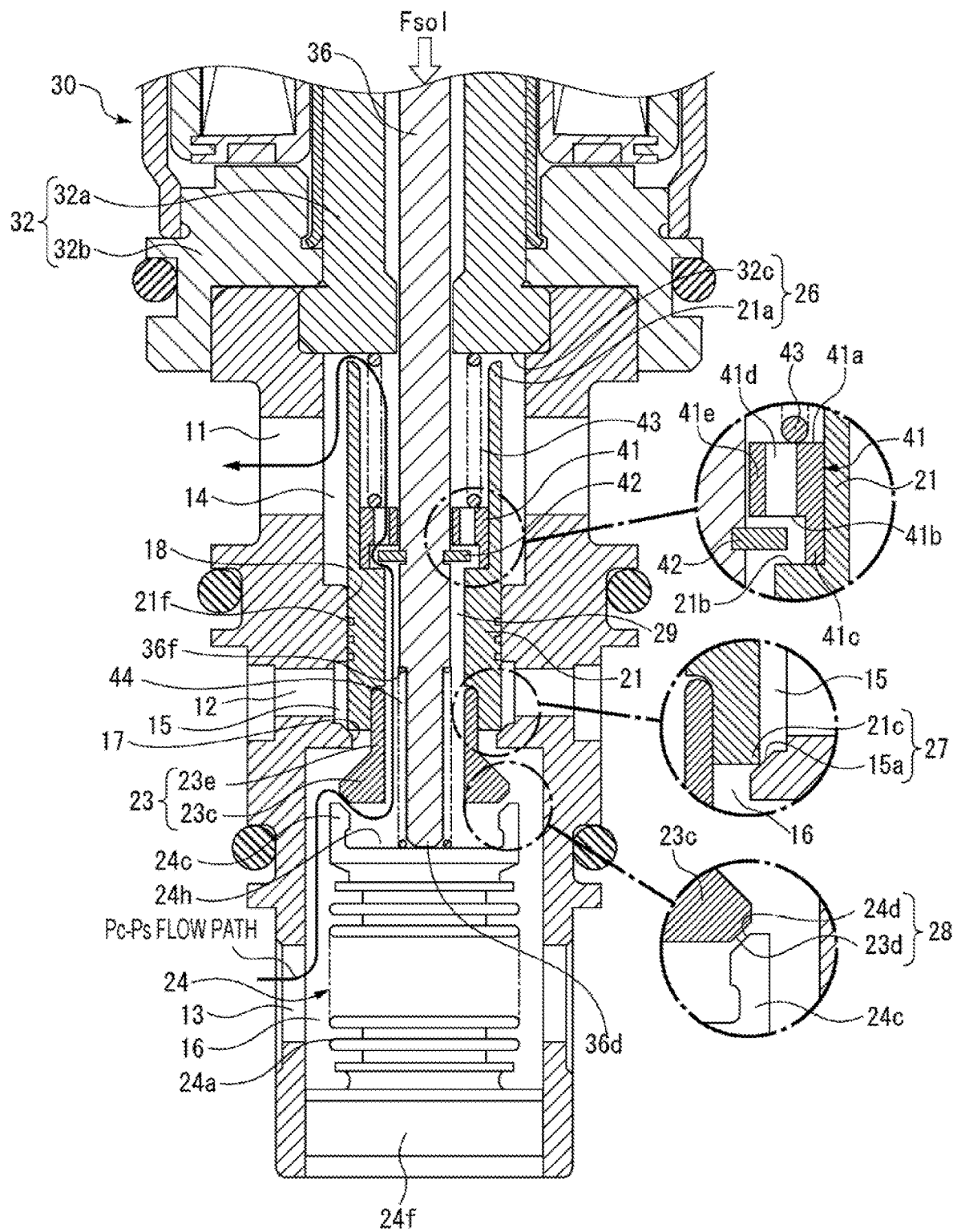
FIG. 2 is an enlarged view of a valve body, a valve element, and a part of the solenoid, showing the capacity control valve according to the first embodiment of the present invention, and shows a liquid refrigerant discharge state when the third valve chest is under a high pressure, the solenoid is in an ON state, the main valve is brought into a closed state, and the auxiliary valve is brought into an open state.
Figure 3:
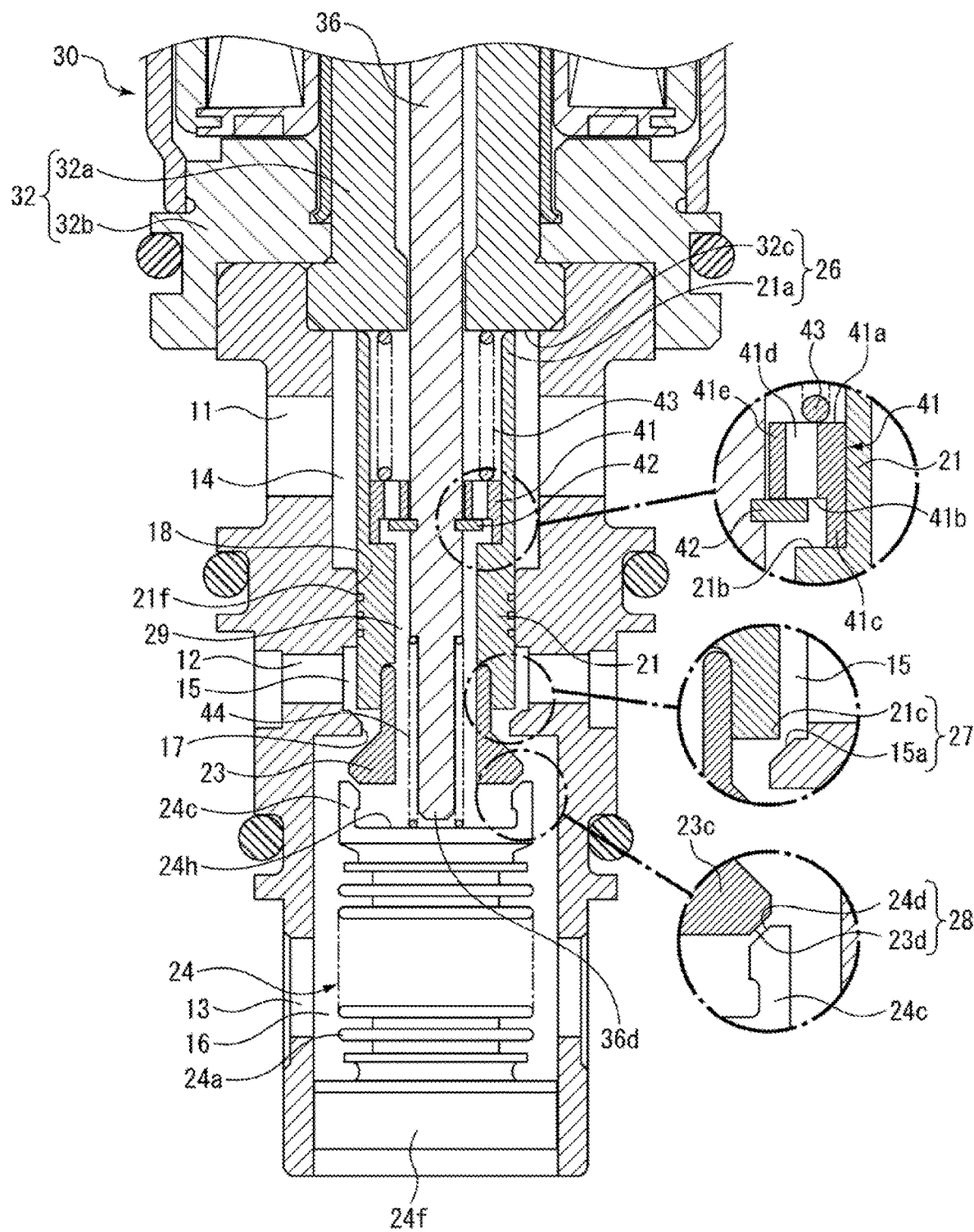
FIG. 3 is an enlarged view of the valve body, the valve element, and a part of the solenoid, showing the capacity control valve according to the first embodiment of the present invention, and shows a state when the third valve chest is under a high pressure, the solenoid is in an OFF state, an auxiliary valve portion is kept in an open state, and the main valve is brought into an open state.

A capacity control valve according to a first embodiment of the present invention will be described with reference to FIGS. 1 to 3. In FIG. 1, reference numeral 1 is a capacity control valve. The capacity control valve 1 mainly includes a valve body 10, a valve element 20, a pressure-sensitive element 24, and a solenoid 30.

Hereinafter, the respective components constituting the capacity control valve 1 will be described with reference to FIG. 1 and FIG. 2. The valve body 10 is composed of a metal such as brass, iron, aluminum, stainless steel, or a synthetic resin material, or the like. The valve body 10 is a hollow cylindrical member having a through hole that extends through it in an axial direction with a first valve chest 14, a second valve chest 15 adjacent to the first valve chest 14, and a third valve chest 16 adjacent to the second valve chest 15 continuously disposed in sections of the through hole.

Second communication passages 12 are connected to the second valve chest 15. The second communication passages 12 are configured to communicate with the interior of a discharge chamber (not shown) of the variable capacity compressor so that the opening and closing of the capacity control valve 1 allows fluid under a discharge pressure Pd (a second pressure according to the present invention) to flow from the second valve chest 15 into the third valve chest 16.

Third communication passages 13 are connected to the third valve chest 16. The third communication passages 13 communicate with a control chamber (not shown) of the variable capacity compressor so that the opening and closing of the capacity control valve 1 causes the fluid under the discharge pressure Pd flowing from the second valve chest 15 into the third valve chest 16 to flow out to the control chamber (the crank chamber) of the variable capacity compressor, or causes fluid under a control chamber pressure Pc (a third pressure according to the present invention) flowing into the third valve chest 16 to flow out to a suction chamber of the variable capacity compressor through an intermediate communication passage 29 described later and the first valve chest 14.

Furthermore, first communication passages 11 are connected to the first valve chest 14. The first communication passages 11 guide fluid under a suction pressure Ps (a first pressure according to the present invention) from the suction chamber of the variable capacity compressor to the pressure-sensitive element 24 through the intermediate communication passage 29 described later so as to control the suction pressure of the compressor to a set value.

A hole 18 is continuously formed between the first valve chest 14 and the second valve chest 15, the hole 18 having a diameter smaller than these chests. The hole 18 slides in relation to a labyrinth 21f described later to form a seal portion to seal a gap between the first valve chest 14 and the second valve chest 15. In addition, a valve hole 17 is continuously provided between the second valve chest 15 and the third valve chest 16, the valve hole 17 having a diameter smaller than these chests. A main valve seat 15a is formed around the valve hole 17 on the side of the second valve chest 15. The main valve seat 15a is separated from and comes into contact with a main valve portion 21c described later to control the opening and closing of the communication between the second valve chest 15 and the third valve chest 16.

The pressure-sensitive element 24 is disposed inside the third valve chest 16. In the pressure-sensitive element 24, one end of a metal bellows 24a is joined to a partition adjustment portion 24f in a sealed manner. The bellows 24a is made of phosphor bronze, stainless steel or the like, and is designed to have a spring constant of a predetermined value. The interior space of the pressure-sensitive element 24 is a vacuum or contains air. Then, the pressure-sensitive element 24 is configured such that the pressure acts on an effective pressure-receiving area of the bellows 24a of the pressure-sensitive element 24 so as to operate to extend and contract the pressure-sensitive element 24. A head portion 24c is disposed on the free end side of the pressure-sensitive element 24, and an auxiliary valve seat 24d is formed in the head portion 24c. The auxiliary valve seat 24d comes into contact with and is separated from an auxiliary valve portion 23d described later so as to control the opening and closing of the communication between the third valve chest 16 and the intermediate communication passage 29.

In addition, a flange portion 24h is formed in the head portion 24c of the pressure-sensitive element 24 and is pressed by a rod 36 of the solenoid 30 described later. The pressure-sensitive element 24 extends and contracts by being directly pressed by the rod 36 so that the auxiliary valve portion 23d is opened and closed. As described later, the pressure-sensitive element 24 extends and contracts according to the suction pressure Ps guided to the pressure-sensitive element 24 through the intermediate communication passage 29, and extends and contracts by the pressing force of the rod 36.

The partition adjustment portion 24f of the pressure-sensitive element 24 is hermetically fitted and fixed so as to seal off the third valve chest 16 of the valve body 10. If the partition adjustment portion 24f is screwed and fixed with a set screw (not shown), the spring force of the compression spring arranged in parallel within the bellows 24a or the bellows 24a can be axially moved and adjusted.

The first communication passages 11, the second communication passages 12, and the third communication passages 13 are, respectively, two to six in number, for example, and are spaced evenly around a peripheral surface of the valve body 10, extending therethrough. Furthermore, mounting grooves for O-rings are provided on the outer peripheral surface of the valve body 10 at three locations spaced apart in the axial direction. In the respective mounting grooves, O-rings 47, 48, and 49 are mounted for sealing a gap between the valve body 10 and a mounting hole (not shown) of a casing that is fitted onto the valve body 10, and respective flow paths of the first communication passages 11, the second communication passages 12, and the third communication passages 13 are configured as independent flow paths.

Next, the valve element 20 will be described. The valve element 20 mainly includes a main valve element 21 and an adapter 23 which are formed of a hollow cylindrical member. First, the main valve element 21 will be described. The main valve element 21 is a hollow cylindrical member, and the labyrinth 21f is formed at a substantially central portion of the outer peripheral portion in the axial direction of the main valve element 21. The labyrinth 21f slides in relation to the hole 18 formed between the side of the first valve chest 14 and the side of the second valve chest 15 to form a seal portion to seal the gap between the first valve chest 14 and the second valve chest 15. Thus, the first valve chest 14 and the second valve chest 15 are configured as independent valve chests.

The main valve element 21 is arranged on the side of the first valve chest 14 and the side of the second valve chest 15 with the labyrinth 21f interposed therebetween. The main valve portion 21c is formed at an end of the main valve element 21 arranged in the second valve chest 15, and the main valve portion 21c is separated from and comes into contact with the main valve seat 15a to control the opening and closing of the valve hole 17 that communicates the second valve chest 15 and the third valve chest 16. The main valve portion 21c and the main valve seat 15a constitute a main valve 27. Furthermore, a shutoff valve portion 21a is formed at an end of the main valve element 21 arranged in the first valve chest 14. The shutoff valve portion 21a comes into contact with an end 32c of a core 32 to shut off the communication between the intermediate communication passage 29 and the first valve chest 14 when the solenoid 30 is turned off as described later. The shutoff valve portion 21a and the end 32c of the core 32 constitute a shutoff valve 26. The shutoff valve portion 21a and the main valve portion 21c of the valve element 20 are formed so as to perform opening and closing operations in opposite directions.

Next, the adapter 23 constituting the valve element 20 will be described. The adapter 23 is a hollow cylindrical member, and mainly includes a large diameter portion 23c formed with a large diameter, and a cylindrical portion 23e formed with a smaller diameter than the large diameter portion 23c. The cylindrical portion 23e is fitted to the open end of the main valve element 21 on the side of the main valve portion 21c to constitute the valve element 20. Thus, the intermediate communication passage 29 is formed inside the main valve element 21 and the adapter 23, that is, inside the valve element 20 to extend through it in the axial direction. In addition, the auxiliary valve portion 23d is formed in the large diameter portion 23c of the adapter 23, and the auxiliary valve portion 23d comes into contact with and is separated from the auxiliary valve seat 24d formed in the head portion 24c of the pressure-sensitive element 24 to open and close the communication between the third valve chest 16 and the intermediate communication passage 29. The auxiliary valve portion 23d and the auxiliary valve seat 24d constitute the auxiliary valve 28.

Next, the solenoid 30 will be described. The solenoid 30 includes the rod 36, a plunger case 38, an electromagnetic coil 31, a core 32 including a center post 32a and a base member 32b, a plunger 35, a plate 34, and a solenoid case 33. The plunger case 38 is a bottomed hollow cylindrical member with one end open. The plunger 35 is arranged so as to be axially movable with respect to the plunger case 38 between the plunger case 38 and the center post 32a arranged inside the plunger case 38. The core 32 is fitted to the valve body 10 and is arranged between the plunger 35 and the valve body 10. The rod 36 is arranged so as to extend through the center post 32a of the core 32 and the valve element 20 arranged in the valve body 10, and there is a gap between the road 36, and a through hole 32e of the center post 32a of the core 32 and the intermediate communication passage 29 of the valve element 20, so that the road 36 can move relative to the core 32 and the valve element 20. Furthermore, one end 36e of the rod 36 is connected to the plunger 35, and a pressing portion 36d at the other end is in contact with the flange portion 24h of the head portion 24c of the pressure-sensitive element 24. Thus, the rod 36 can be driven by an electromagnetic force generated between the core 32 and the plunger 35, and the rod 36 can directly press the pressure-sensitive element 24 to extend and contract the pressure-sensitive element 24.

Furthermore, the open end of the plunger case 38 is fixed to an inner periphery of the base member 32b of the core 32 in a sealed manner, and the solenoid case 33 is fixed to an outer periphery of the base member 32b in a sealed manner. In addition, the electromagnetic coil 31 is arranged in a space surrounded by the plunger case 38, the base member 32b of the core 32, and the solenoid case 33, and does not come into contact with the refrigerant, allowing a decrease in insulation resistance to be prevented.

Next, a spacer 41 constituting a part of the valve element 20 will be described. The spacer 41 is a cylindrical member having a base 41e and a flange 41c extending in the axial direction from the base 41e, and is fitted and fixed to an inner-diameter portion of the valve element 20. The flange 41c is arranged in contact with a stepped portion 21b formed between the shutoff valve portion 21a and the main valve portion 21c at the inner diameter portion of the valve element 20 to form a gap between the stepped portion 21b and the spacer 41. In this gap, a retaining ring 42 (a locking portion according to the present invention) fixed to the rod 36 is arranged. Furthermore, the spacer 41 has a flow hole 41d through which the refrigerant flows.

The retaining ring 42 fixed to the rod 36 comes into contact with a main valve portion side end 41b of the base 41e of the spacer 41 fixed to the valve element 20, so that the driving force of the rod 36 of the solenoid 30 acts on the valve element 20 as a force in a valve opening direction of the main valve portion 21c. On the other hand, the retaining ring 42 fixed to the rod 36 comes into contact with the stepped portion 21b of the valve element 20, so that the driving force of the solenoid 30 acts on the valve element 20 as a force in a valve closing direction of the main valve portion 21c.

Next, a spring 43 (a first biasing member according to the present invention) and a spring 44 (a second biasing member according to the present invention) that are disposed with the retaining ring 42 interposed therebetween will be described. The spring 43 is disposed between the core 32 and the spacer 41 of the valve element 20. Specifically, one end of the spring 43 is in contact with the core 32, and the other end is in contact with a shutoff valve portion side end 41a of the base 41e of the spacer 41 provided in the valve element 20. Thus, the biasing force of the spring 43 acts on the valve element 20 in the valve closing direction of the main valve portion 21c.

Meanwhile, the spring 44 is disposed between the pressure-sensitive element 24 and the rod 36. Specifically, one end of the spring 44 is in contact with a stepped portion 36f formed on the rod 36 between the pressing portion 36d of the rod 36 and the retaining ring 42, and the other end is in contact with the flange portion 24h of the head portion 24c of the pressure-sensitive element 24. Thus, the biasing force of the spring 44 acts on the valve element 20 through the retaining ring 42 and the spacer 41 in the valve opening direction of the main valve portion 21c. The spring constant of the spring 44 is set to be larger than the spring constant of the spring 43, and the biasing force of the spring 44 is larger than the biasing force of the spring 43.

The operation of the capacity control valve 1 having the configuration described above will be described. A flow path from the third valve chest 16 to the first valve chest 14 through the intermediate communication passage 29 is hereinafter referred to as a "Pc-Ps flow path". In addition, a flow path from the second valve chest 15 to the third valve chest 16 through the valve hole 17 is hereinafter referred to as a "Pd-Pc flow path".

The operation of each valve, first, when the rod 36 is in a stopped state, the rod is in operation, and the rod is then stopped will be described. First, when the solenoid 30 is in a non-energized state, the resultant force of the biasing force of the pressure-sensitive element 24 and the biasing force of the spring 44 exceeds the biasing force of the spring 43. Therefore, the rod 36 is pushed up to the side of the spring 43, and the retaining ring 42 comes into contact with the spacer 41, and the valve element 20 moves in the valve opening direction of the main valve portion 21c to fully open the main valve portion 21c, and the shutoff valve portion 21a comes into contact with the end 32c of the core 32 to fully close the shutoff valve portion 21a (see FIG. 3).

Next, when the solenoid 30 starts to be energized from the non-energized state, the rod 36 is gradually driven in an advancing direction (in the direction in which the rod 36 projects outward from the end 32c of the core 32). At this time, the spacer 41 is pressed downward by the spring 43, the retaining ring 42 fixed to the rod 36 and the spacer 41 fixed to the valve element 20 move in contact with each other, and the rod 36 and the valve element 20 move integrally. Thus, the shutoff valve portion 21a opens from the fully closed state, and the main valve portion 21c is gradually narrowed from the fully open state (see FIG. 1).

When the rod 36 is further driven in the advancing direction, the shutoff valve portion 21a is brought into the fully open state, and the main valve portion 21c comes into contact with the main valve seat 15a to be brought into the fully closed state, so that the movement of the valve element 20 is stopped. When the rod 36 is further driven in the advancing direction from this state, the retaining ring 42 is separated from the spacer 41, the rod 36 moves relative to the main valve element 21, and the pressing portion 36d of the rod 36 presses the flange portion 24h of the pressure-sensitive element 24 to contract the sensitive element 24, which allows the auxiliary valve portion 23d to be forcibly opened (see FIG. 2). When the rod 36 is further driven in the advancing direction after the auxiliary valve portion 23d opens, the retaining ring 42 comes into contact with the stepped portion 21b of the valve element 20, so that the rod 36 is stopped.

Next, a control state of the capacity control valve 1 will be described with reference to FIG. 1. The control state is a state in which the auxiliary valve portion 23d is in a closed state, and the main valve portion 21c is set to have a predetermined opening by the solenoid 30 so that the pressure in the suction chamber of the variable capacity compressor is controlled to reach the set value Pset. In this state, the fluid under the suction pressure Ps flowing from the suction chamber of the variable capacity compressor to the first valve chest 14 through the first communication passages 11 acts on the pressure-sensitive element 24 through the intermediate communication passage 29. The main valve portion 21c is stopped at a position where the force of the spring 43 in the valve closing direction, the force of the spring 44 in the valve opening direction, the force of the solenoid 30, and the biasing force of the pressure-sensitive element 24 that extends and contracts according to the suction pressure Ps are balanced. However, the suction pressure Ps may fluctuate due to disturbance or the like. For example, when the pressure Ps in the suction chamber becomes higher than the set value Pset, the pressure-sensitive element 24 contracts and the opening of the main valve portion 21c becomes smaller. Thus, the Pd-Pc flow path is narrowed, so that the amount of refrigerant under the discharge pressure Pd flowing from the discharge chamber to the crank chamber reduces and the pressure in the crank chamber decreases. As a result, the angle of inclination of the swash plate of the compressor becomes larger, and the discharge capacity of the compressor increases, causing the discharge pressure to decrease. On the other hand, when the pressure Ps in the suction chamber becomes lower than the set value Pset, the pressure-sensitive element 24 extends and the opening of the main valve portion 21c becomes larger. Thus, the Pd-Pc flow path is extended, so that the amount of refrigerant under the discharge pressure Pd flowing from the discharge chamber to the crank chamber increases, and the pressure in the crank chamber increases. As a result, the angle of inclination of the swash plate of the compressor becomes smaller, causing the discharge capacity of the compressor to reduce and causing the discharge pressure to increase. Thus, the capacity control valve 1 can control the pressure in the suction chamber of the variable capacity compressor so as to reach the set value Pset.

Next, a liquid refrigerant discharge state of the capacity control valve 1 will be described with reference to FIG. 2. After the compressor is stopped for a long period of time, a liquid refrigerant (a refrigerant that has been liquefied by cooling while the compressor is inoperative) is accumulated in the crank chamber. Therefore, in order to secure a predetermined discharge pressure and discharge flow rate after activating the compressor, it is necessary to discharge the liquid refrigerant as quickly as possible. During the liquid refrigerant discharge, the pressure in the third valve chest 16 communicating with the crank chamber becomes higher and the suction pressure Ps also becomes higher. Thus, the pressure-sensitive element 24 contracts and the valve element 20 is pressed downward by the spring 43, so that the main valve portion 21c is brought into a closed state and the auxiliary valve portion 23d is brought into an open state. Even in this state, the liquid refrigerant can be discharged from the crank chamber to the suction chamber through the Pc-Ps flow path. However, as the discharge of the liquid refrigerant discharge progresses, the pressure in the third valve chest 16 and the suction pressure Ps gradually decrease, so that the opening of the auxiliary valve portion 23d gradually becomes smaller, resulting in an increase in time to complete the discharge of the liquid refrigerant. Then, the solenoid 30 is driven in the advancing direction, and the pressure-sensitive element 24 is pressed by the rod 36 to forcibly bring the auxiliary valve portion 23d into the fully open state. Thus, the auxiliary valve portion 23d is kept in the fully open state, so that the opening of the auxiliary valve portion 23d does not change from the start of the liquid refrigerant discharge to the completion of the liquid refrigerant discharge, allowing the liquid refrigerant to be discharged from the crank chamber to the suction chamber thorough the Pc-Ps flow path in a short time.

In addition, conventionally, during the liquid refrigerant discharge operation, attention has been focused only on how to complete the discharge of the liquid refrigerant in a short time regardless of the engine load. However, even during the liquid refrigerant discharge, when the engine output is high, the load on the load compressor may be desired to be reduced. In addition, during the liquid refrigerant discharge, the auxiliary valve portion 23d is brought into the open state, so that no biasing force acts on the valve element 20 from the pressure-sensitive element 24, making it difficult to quickly drive the valve element 20. The capacity control valve 1 according to the present invention can easily drive the valve element 20 even during the liquid refrigerant discharge.

Hereinafter, the operation of the capacity control valve 1 for reducing the engine load during the liquid refrigerant discharge will be described with reference to FIG. 3. In order to reduce the engine load during the liquid refrigerant discharge, the solenoid 30 is turned off, and a magnetic attractive force Fsol between the core 32 and the plunger 35 is set to zero. At this time, since the upward pressure and the downward pressure acting on the valve element 20 are set to be balanced, the main force acting on the valve element 20 is the biasing force of the spring 44 and the spring 43. Since the biasing force of the spring 44 is set to be larger than the biasing force of the spring 43, the rod 36 is pushed up by the biasing force of the spring 44, the retaining ring 42 comes into contact with the spacer 41 so that the valve element 20 is driven, and the main valve portion 21c is fully opened. When the main valve portion 21c is fully opened, the amount of refrigerant flowing from the discharge chamber of the compressor to the crank chamber through the Pd-Pc flow path increases and the pressure Pc in the crank chamber becomes higher, so that the compressor is operated with the minimum capacity. Thus, likewise during the liquid refrigerant discharge, even when the auxiliary valve portion 23d is in the open state and no force acts on the valve element 20 from the pressure-sensitive element 24, bringing the main valve portion 21c into the fully open state from the fully closed state enables the load on the compressor to be reduced, and thus enables the engine load to be reduced also during the liquid refrigerant discharge.

Furthermore, also in order to reduce the load on the engine in an operation state in which the capacity control valve 1 controls the pressure in the suction chamber of the compressor so as to reach the set value Pset, as described above, by bringing the solenoid 30 into the non-energized state, the main valve portion 21c is brought into the fully open state to allow the load on the engine to be reduced.

Thus, the rod 36 moves integrally with the valve element 20 while the main valve portion 21c is brought from the fully open state into the fully closed state, and after the main valve portion 21c is fully closed, the rod 36 moves relative to the valve element 20 to press the sensitive element 24, allowing the auxiliary valve portion 23d to be opened. That is, one rod 36 can open and close the main valve portion 21c and the auxiliary valve portion 23d, which are different. In addition, since the spring constant of the spring 44 is set to be larger than the spring constant of the spring 43, and the biasing force of the spring 44 is larger than the biasing force of the spring 43, the opening and closing states of the main valve portion 21c and the auxiliary valve portion 23d can be opened and closed in any combination. That is, the main valve portion 21c can be opened while the auxiliary valve portion 23d be opened, the main valve portion 21c can be opened while the auxiliary valve portion 23d be closed, the main valve portion 21c can be closed while the auxiliary valve portion 23d be opened, and the main valve portion 21c can be closed while the auxiliary valve portion 23d be closed.

Second Embodiment

Figure 4:
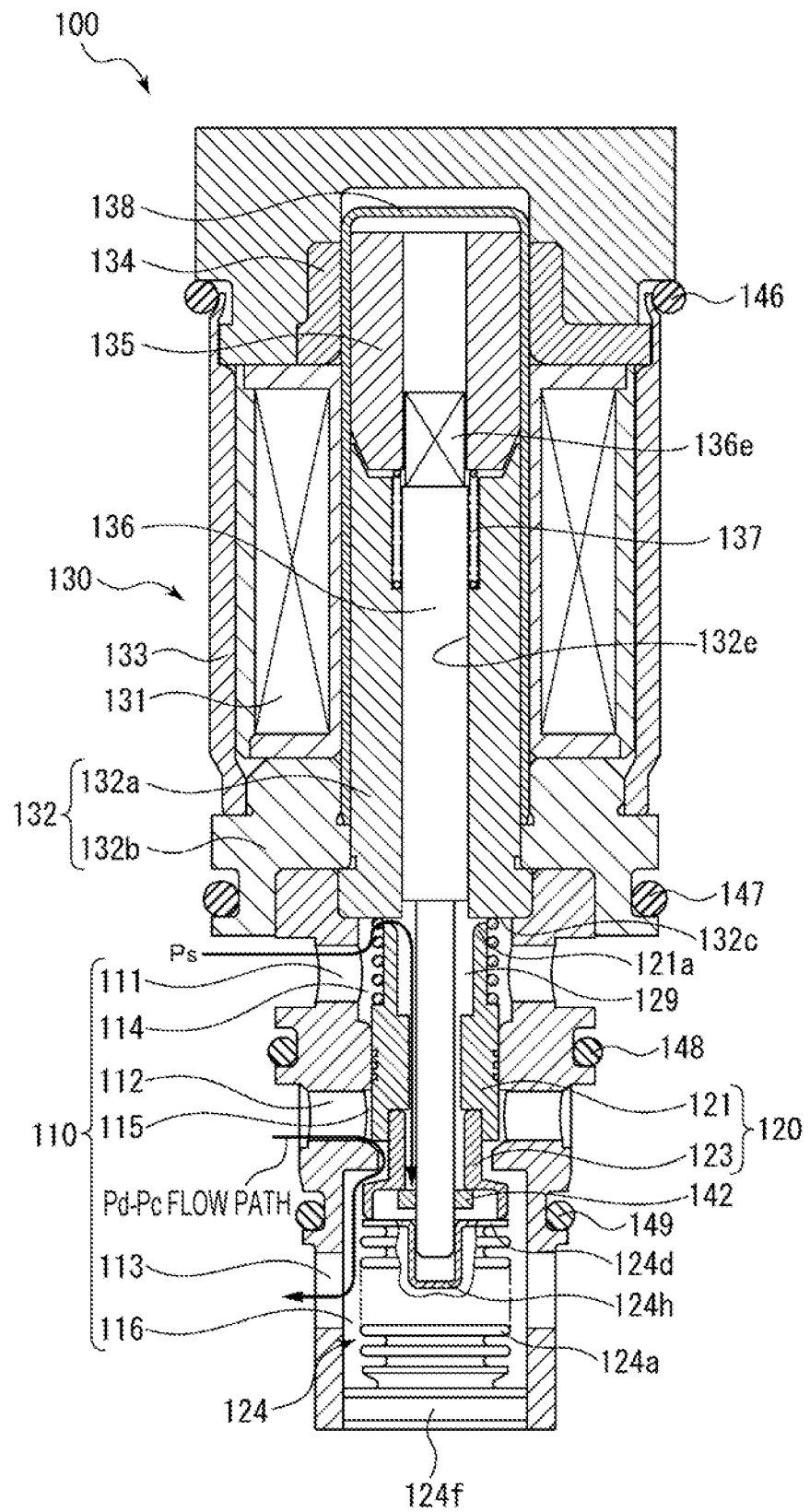
FIG. 4 is a front sectional view showing a capacity control valve according to a second embodiment of the present invention, and shows a control state of the capacity control valve when a third valve chest is under a low pressure, a solenoid is in an ON state, a main valve is brought into an open state, and an auxiliary valve is brought into a closed state.

A capacity control valve according to a second embodiment of the present invention will be described with reference to FIGS. 4 to 6. In FIG. 4, reference numeral 100 is a capacity control valve. The capacity control valve 100 mainly includes a valve body 110, a valve element 120, a pressure-sensitive element 124, and a solenoid 130.

The respective components constituting the capacity control valve 100 will be described with reference to FIG. 4 and FIG. 5. The capacity control valve 100 mainly includes the valve body 110, the valve element 120, the pressure-sensitive element 124, and the solenoid 130.

The valve body 110 is composed of a metal such as brass, iron, aluminum, stainless steel, or a synthetic resin material, or the like. The valve body 110 is a hollow cylindrical member having a through hole that extends through it in an axial direction with a first valve chest 114, a second valve chest 115 adjacent to the first valve chest 114, and a third valve chest 116 adjacent to the second valve chest 115 continuously disposed in sections of the through hole.

Second communication passage 112 are connected to the second valve chest 115. The second communication passages 112 are configured to communicate with the inside of a discharge chamber (not shown) of the variable capacity compressor so that the opening and closing of the capacity control valve 100 allows fluid under the discharge pressure Pd to flow from the second valve chest 115 into the third valve chest 116.

Third communication passage 113 are connected to the third valve chest 116. The third communication passages 113 communicate with a control chamber (not shown) of the variable capacity compressor so that the opening and closing of the capacity control valve 100 causes the fluid under the discharge pressure Pd flowing from the second valve chest 115 into the third valve chest 116 to flow out to the control chamber (the crank chamber) of the variable capacity compressor, or causes fluid under the control chamber pressure Pc flowing into the third valve chest 116 to flow out to a suction chamber of the variable capacity compressor through an intermediate communication passage 129 described later and the first valve chest 114.

Furthermore, first communication passages 111 are connected to the first valve chest 114. The first communication passages 111 guide fluid under the suction pressure Ps from the suction chamber of the variable capacity compressor to the pressure-sensitive element 124 through the intermediate communication passage 129 described later to control the suction pressure of the compressor to a set value.

A hole 118 is continuously formed between the first valve chest 114 and the second valve chest 115, the hole 118 having a diameter smaller than these chests. The hole 118 slides in relation to a labyrinth 121f described later to form a seal portion to seal a gap between the first valve chest 114 and the second valve chest 115. In addition, a valve hole 117 is continuously provided between the second valve chest 115 and the third valve chest 116, the valve hole 117 having a diameter smaller than these chests. A main valve seat 115a is formed around the valve hole 117 on the side of the second valve chest 115. The main valve seat 115a is separated from and comes into contact with a main valve portion 121c described later to control the opening and closing of the communication between the second valve chest 115 and the third valve chest 116.

The pressure-sensitive element 124 is disposed inside the third valve chest 116. In the pressure-sensitive element 124, one end of a metal bellows 124a is joined to a partition adjustment portion 124f in a sealed manner. The bellows 124a is made of phosphor bronze, stainless steel or the like, and is designed to have a spring constant of a predetermined value. The interior space of the pressure-sensitive element 124 is a vacuum or contains air. Then, the pressure-sensitive element 124 is configured such that the pressure acts on an effective pressure-receiving area of the bellows 124a of the pressure-sensitive element 124 so as to operate to extend and contract the pressure-sensitive element 124. A head portion 124c is disposed on the free end side of the pressure-sensitive element 124, and an auxiliary valve seat 124d is formed in the head portion 124c. The auxiliary valve seat 124d comes into contact with and is separated from an auxiliary valve portion 123d described later to control the opening and closing of the communication between the third valve chest 116 and the intermediate communication passage 129.

In addition, the head portion 124c of the pressure-sensitive element 124 extends and contracts by being pressed by a rod 136 of the solenoid 130 described later so that the auxiliary valve portion 123d is opened and closed. As described later, the pressure-sensitive element 124 extends and contracts according to the suction pressure Ps guided to the pressure-sensitive element 124 through the intermediate communication passage 129, and extends and contracts by the pressing force of the rod 136.

The partition adjustment portion 124f of the pressure-sensitive element 124 is hermetically fitted and fixed so as to seal off the third valve chest 116 of the valve body 110. If the partition adjustment portion 124f is screwed and fixed with a set screw (not shown), the spring force of the compression spring arranged in parallel within the bellows 124a or the bellows 124a can be axially moved and adjusted.

The first communication passages 111, the second communication passages 112, and the third communication passages 113 are, respectively, two to six in number, for example, and are spaced evenly around a peripheral surface of the valve body 110, extending therethrough. Furthermore, mounting grooves for O-rings are provided on the outer peripheral surface of the valve body 110 at three locations spaced apart in the axial direction. In the respective mounting grooves, O-rings 147, 148, and 149 are mounted for sealing a gap between the valve body 110 and a mounting hole (not shown) of a casing that is fitted onto the valve body 110. Respective flow paths of the first communication passages 111, the second communication passages 112, and the third communication passages 113 are configured as independent flow paths.

Next, the valve element 120 will be described. The valve element 120 mainly includes a main valve element 121 and an adapter 123, which are formed of a hollow cylindrical member. First, the main valve element 121 will be described. The main valve element 121 is a hollow cylindrical member, and the labyrinth 121f is formed at a substantially central portion of the outer peripheral portion in the axial direction of the main valve element 121. The labyrinth 121f slides in relation to the hole 118 formed between the side of the first valve chest 114 and the side of the second valve chest 115 to form a seal portion to seal the gap between the first valve chest 114 and the second valve chest 115. Thus, the first valve chest 114 and the second valve chest 115 are configured as independent valve chests.

The main valve element 121 is arranged on the side of the first valve chest 114 and the side of the second valve chest 115 with the labyrinth 121f interposed therebetween. The main valve portion 121c is formed at an end of the main valve element 121 arranged in the second valve chest 115, and the main valve portion 121c is separated from and comes into contact with the main valve seat 115a to control the opening and closing of the valve hole 117 that communicates the second valve chest 115 and the third valve chest 116. The main valve portion 121c and the main valve seat 115a constitute a main valve 127. Furthermore, a shutoff valve portion 121a is formed at an end of the main valve element 121 arranged in the first valve chest 114. The shutoff valve portion 121a comes into contact with an end 132c of a core 132 when the solenoid 130 is turned off as described later to shut off the communication between the intermediate communication passage 129 and the first valve chest 114. The shutoff valve portion1 121a and the end 132c of the core 132 constitute a shutoff valve 126. The shutoff valve portion 121a and the main valve portion 121c are formed so as to perform opening and closing operations in opposite directions.

Next, the adapter 123 constituting the valve element 120 will be described. The adapter 123 is a hollow cylindrical member and mainly includes a large diameter portion 123c formed with a large diameter, and a cylindrical portion 123e formed with a smaller diameter than the large diameter portion 123c. The cylindrical portion 123e is fitted to the open end of the main valve element 121 on the side of the main valve portion 121c to constitute the valve element 120. Thus, the intermediate communication passage 129 is formed inside the main valve element 121 and the adapter 123, that is, inside the valve element 120 to extend through it in the axial direction. In addition, the auxiliary valve portion 123d is formed at the distal end of the large diameter portion 123c, and the auxiliary valve portion 123d comes into contact with and is separated from the auxiliary valve seat 124d of the pressure-sensitive element 124 to open and close the communication between the third valve chest 116 and the intermediate communication passage 129. The auxiliary valve portion 123d and the auxiliary valve seat 124d constitute the auxiliary valve 128.

Next, the solenoid 130 will be described. The solenoid 130 includes the rod 136, a plunger case 138, an electromagnetic coil 131, a core 132 including a center post 132a and a base member 132b, a plunger 135, a plate 134, and a solenoid case 133. The plunger case 138 is a bottomed hollow cylindrical member with one end open. The plunger 135 is arranged so as to be axially movable with respect to the plunger case 138 between the plunger case 138 and a center post 132a arranged inside the plunger case 138. The core 132 is fitted to the valve body 110 and is arranged between the plunger 135 and the valve body 110. The rod 136 is arranged so as to extend through the center post 132a of the core 132 and the valve element 120 arranged in the valve body 110, and there is a gap between the road 136 and a through hole 132e of the center post 132a of the core 132 and the intermediate communication passage 129 of the valve element 120, so that the road 136 can move relative to the core 132 and the valve element 120. Furthermore, one end 136e of the rod 136 is connected to the plunger 135, and a pressing portion 136d at the other end is in contact with the head portion 124c of the pressure-sensitive element 124. Thus, the rod 136 can be driven by an electromagnetic force generated between the core 132 and the plunger 135, and the rod 136 can directly press the pressure-sensitive element 124 to extend and contract the pressure-sensitive element 124.

A spring 137 (a second biasing member according to the present invention) is arranged between the core 132 and the plunger 135 for biasing the plunger 135 so that the plunger 135 is separated from the core 132. Thus, the biasing force of the spring 137 acts in a direction to open the main valve portion 121c of the valve element 120.

Furthermore, the open end of the plunger case 138 is fixed to an inner periphery of the base member 132b of the core 132 in a sealed manner, and the solenoid case 133 is fixed to an outer periphery of the base member 132b in a sealed manner. In addition, the electromagnetic coil 131 is arranged in a space surrounded by the plunger case 138, the base member 132b of the core 132, and the solenoid case 133, and does not come into contact with the refrigerant, allowing a decrease in insulation resistance to be prevented.

Next, a retaining ring 142 (a locking portion according to the present invention) constituting a part of the rod 136 will be described. In the retaining ring 142, a communication passage is formed so as not to prevent the communication between the third valve chest 116 and the intermediate communication passage 129. The retaining ring 142 is a disk-shaped member, and is fitted and fixed to the rod 136 so as to be located between the adapter 123 and the head portion 124c of the pressure-sensitive element 124. The retaining ring 142 comes into contact with the adapter 123 of the valve element 120, so that the driving force of the rod 136 of the solenoid 130 acts on the valve element 120 as a force in the valve opening direction of the main valve portion 121c. On the other hand, the retaining ring 142 fixed to the rod 136 comes into contact with the head portion 124c of the pressure-sensitive element 124, so that the driving force of the rod 136 of the solenoid 130 directly presses the pressure-sensitive element 124 to extend and contract the pressure-sensitive element 124.

Here, a protrusion 124h is formed at the central portion of the head portion 124c of the pressure-sensitive element 124, and a protrusion (not shown) is formed also at the central portion of the partition adjustment portion 124f of the pressure-sensitive element 124 facing the auxiliary valve seat 124d. When the retaining ring 142 fixed to the rod 136 comes into contact with the head portion 124c of the pressure-sensitive element 124, the pressure-sensitive element 124 is contracted. When the pressure-sensitive element 124 is contracted by a predetermined amount, the protrusion 124h and the protrusion of the partition adjustment portion 124f come into contact with each other so that the deformation of the pressure-sensitive element 124 is restricted and the movement of the rod 136 is also restricted.

Next, a spring 143 (a first biasing member according to the present invention) will be described. The spring 143 is disposed between the solenoid 130 and the valve element 120. Specifically, one end of the spring 143 is in contact with the core 132, and the other end is in contact with a stepped portion 121b formed between the shutoff valve portion 121a and the labyrinth 121f of the valve element 120. Thus, the biasing force of the spring 143 acts in a direction to close the main valve portion 121c of the valve element 120.

The spring constant of the spring 137 (the second biasing member) provided between the core 132 and the plunger 135 is set larger than the spring constant of the spring 143 (the first biasing member), and the biasing force of the spring 137 is larger than the biasing force of the spring 143.

The operation of the movement of the rod 136 and the movement of each valve portion of the capacity control valve 100 having the configuration described above will be described. A flow path from the third valve chest 116 to the first valve chest 114 through the intermediate communication passage 129 is hereinafter referred to as "Pc-Ps flow path". A flow path from the second valve chest 115 to the third valve chest 116 through the valve hole 117 is hereinafter referred to as "Pd-Pc flow path".

The operation of each valve, first, when the rod 136 is in a stopped state, the rod 136 is in operation, and the rod 136 is then stopped will be described with reference to FIG. 6. First, when the solenoid 130 is in a non-energized state, the resultant force of the biasing force of the pressure-sensitive element 124 and the biasing force of the spring 137 (FIG. 4) exceeds the biasing force of the spring 143. Therefore, the rod 136 is pushed upward, and the retaining ring 142 comes into contact with the adapter 123, so that the adapter 123 is pressed to fully open the main valve portion 121c, and the shutoff valve portion 121a comes into contact with the end 132c of the core 132 to fully close the shutoff valve portion 121a.

Next, when the solenoid 130 starts to be energized from the non-energized state, the rod 136 is gradually driven in an advancing direction (in the direction in which the rod 136 projects outward from the end 132c of the core 132). At this time, the valve element 120 is pressed downward by the spring 143, the retaining ring 142 fixed to the rod 136 and the adapter 123 of the valve element 120 move in contact with each other, and the rod 136 and the valve element 120 also move integrally. Thus, the shutoff valve portion 121a opens from the fully closed state, and the opening of the main valve portion 121c is gradually narrowed (see FIG. 4).

Figure 5:
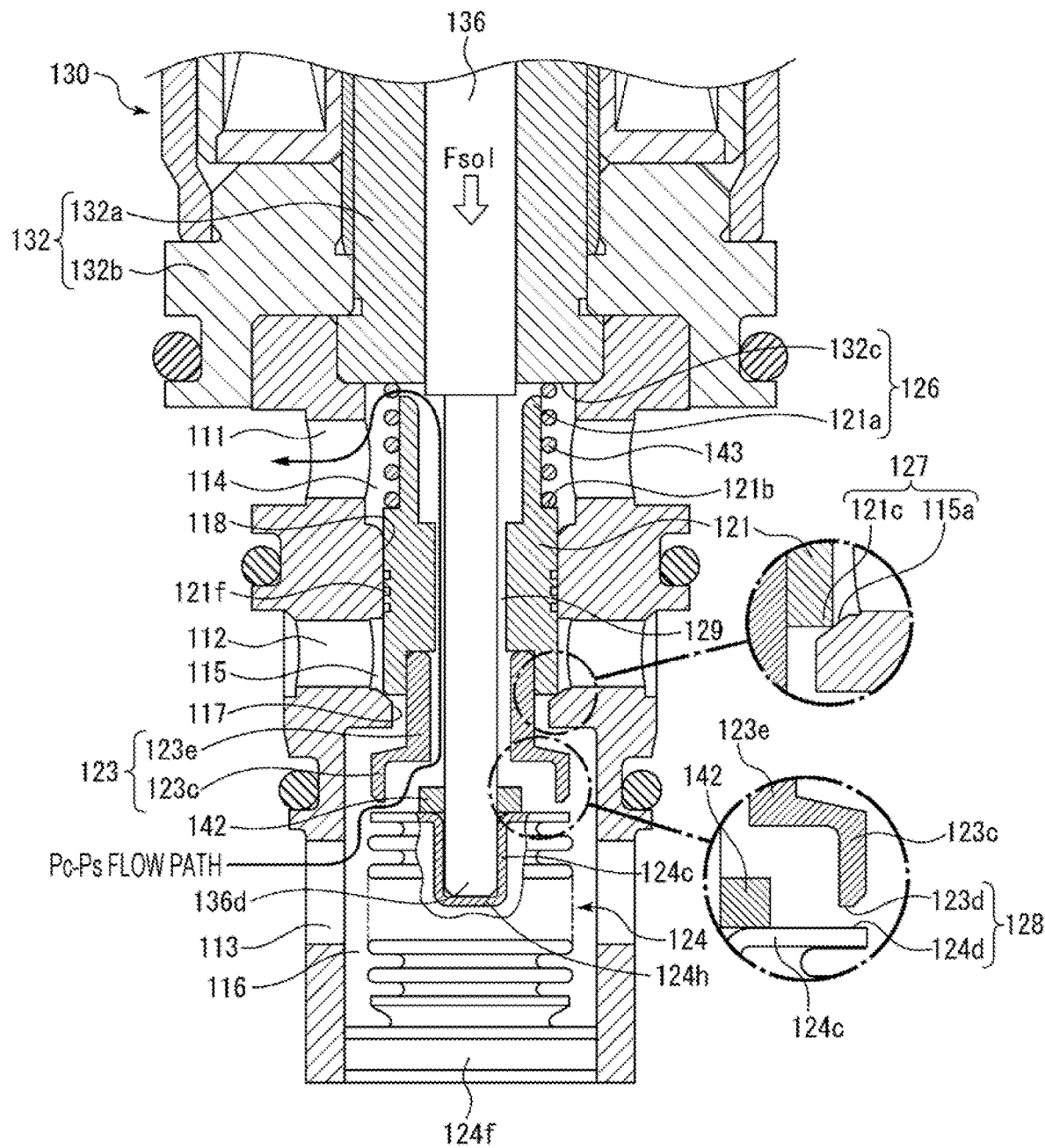
FIG. 5 is an enlarged view of a valve body, a valve element, and a part of the solenoid, showing the capacity control valve according to the second embodiment of the present invention, and shows a liquid refrigerant discharge state when the third valve chest is under a high pressure, the solenoid is in an ON state, the main valve is brought into a closed state, and the auxiliary valve is brought into an open state.
Figure 6:
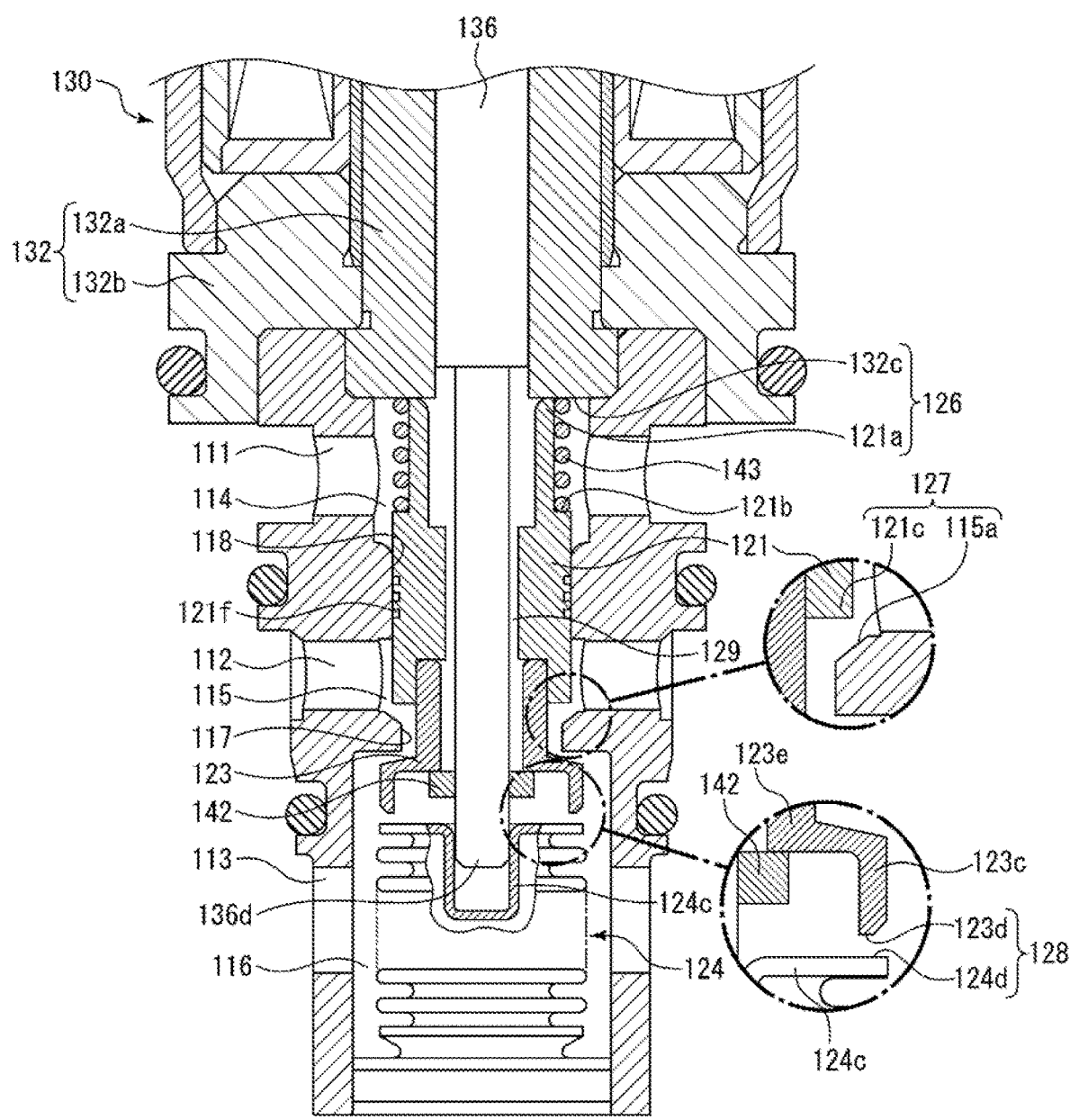
FIG. 6 is an enlarged view of the valve body, the valve element, and a part of the solenoid, showing the capacity control valve according to the second embodiment of the present invention, and shows a state when the third valve chest is under a high pressure, the solenoid is in an OFF state, an auxiliary valve portion is kept in an open state, and the main valve is brought into an open state.
Figure 7:
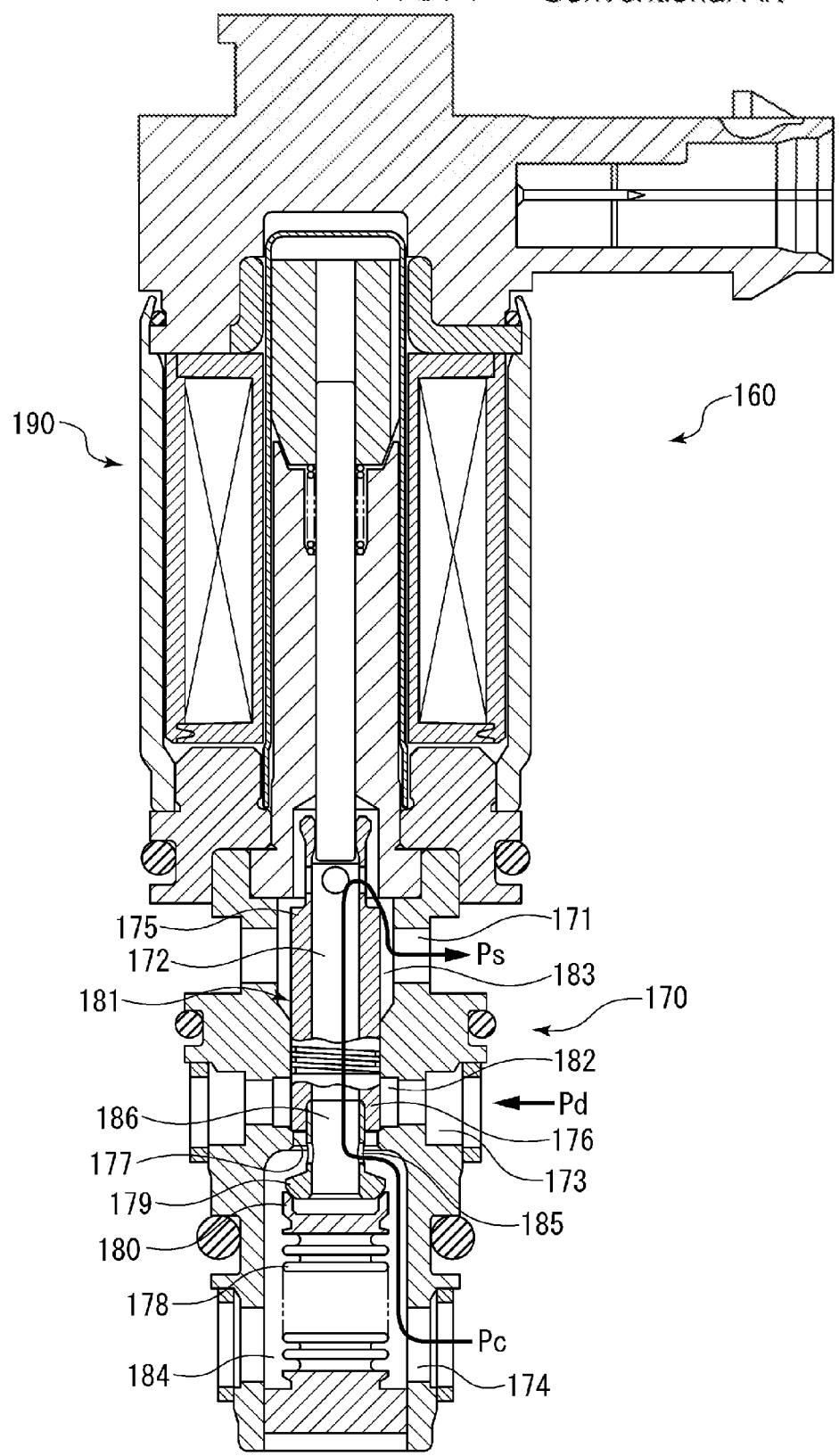
FIG. 7 is a front sectional view showing a conventional capacity control valve.
Figure 8:
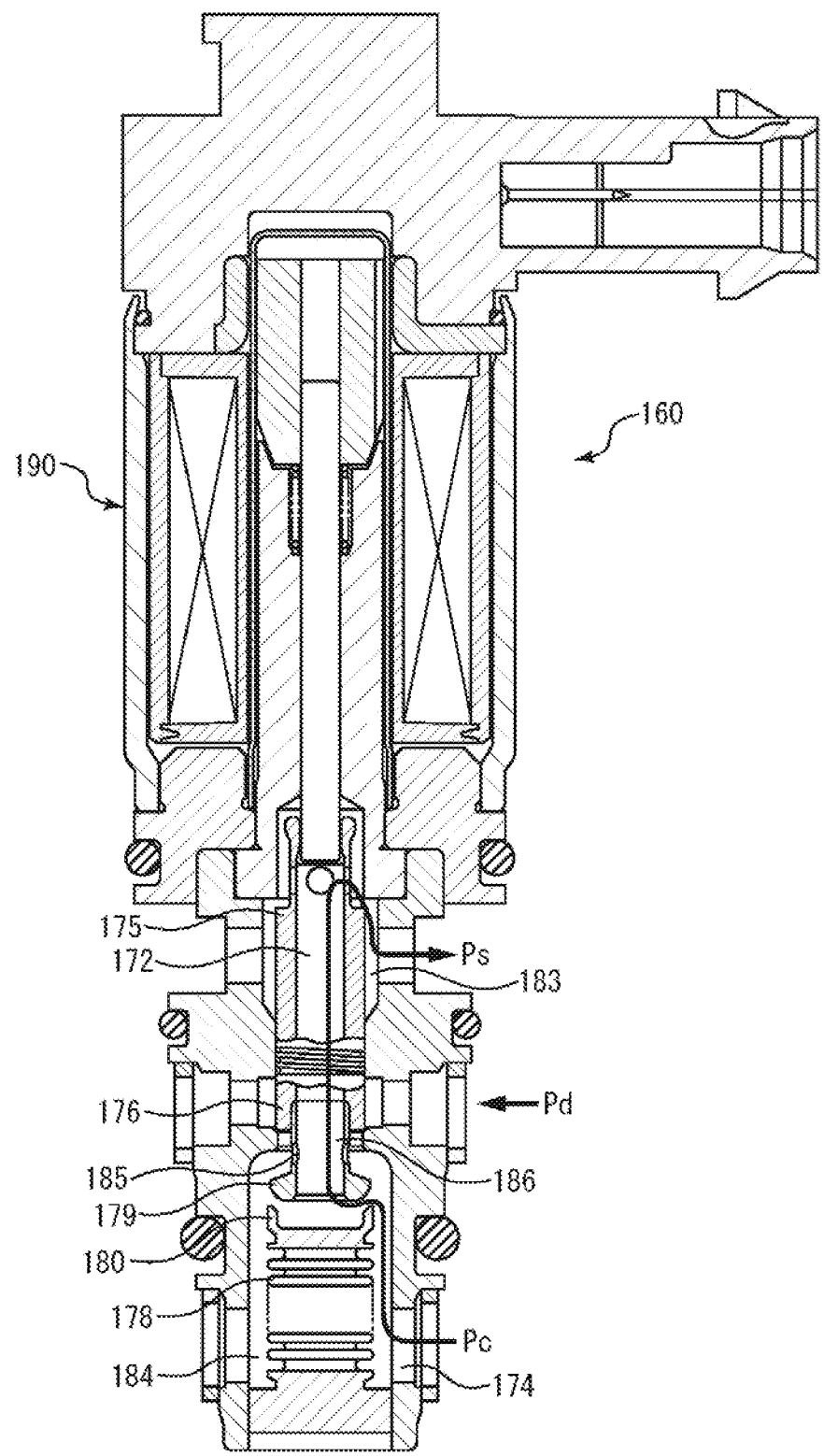
FIG. 8 shows the conventional capacity control valve and a state of the capacity control valve during a liquid refrigerant discharge.

When the rod 136 is further driven in the advancing direction, as shown in FIG. 5, the shutoff valve portion 121a is brought into the fully open state, and the main valve portion 121c comes into contact with the main valve seat 115a to be brought into the fully closed state, so that the movement of the main valve element 121 is stopped. When the rod 136 is further driven in the advancing direction from this state, the rod 136 moves relative to the main valve element 121, and the retaining ring 142 is separated from the adapter 123. When the rod 136 is further driven, the retaining ring 142 of the rod 136 comes into contact with the head portion 124c of the pressure-sensitive element 124, and presses the head portion 124c to contract the pressure-sensitive element 124, which allows the auxiliary valve portion 123d to be forcibly opened. When the pressure-sensitive element 124 is contracted by a predetermined amount, the protrusion 124h and the protrusion (not shown) of the partition adjustment portion 124f come into contact with each other so that the deformation of the pressure-sensitive element 124 is restricted and the movement of the rod 136 is also stopped (see FIG. 5). In addition, instead of pressing the head portion 124c of the pressure-sensitive element 124 by the retaining ring 142 to contract the pressure-sensitive element 124, the pressing portion 136d of the rod 136 may press the head portion 124c of the pressure-sensitive element 124 to contract the pressure-sensitive element 124, causing the auxiliary valve portion 123d to be forcibly opened.

Next, a control state of the capacity control valve 100 will be described with reference to FIG. 4. The control state is a state in which the auxiliary valve portion 123d is in a closed state, and the main valve portion 121c is set to have a predetermined opening by the solenoid 130 so that the pressure in the suction chamber of the variable capacity compressor is controlled to reach the set value Pset. In this state, the fluid under the suction pressure Ps flowing from the suction chamber of the variable capacity compressor to the first valve chest 114 through the first communication passages 111 acts on the pressure-sensitive element 124 through the intermediate communication passage 129. As a result, the main valve portion 121c is stopped at a position where the force of the spring 143 in the valve closing direction, the force of the spring 137 in the valve opening direction, the force of the solenoid 130, and the force of the pressure-sensitive element 124 that extends and contracts according to the suction pressure Ps are balanced. However, the pressure Ps in the suction chamber may become higher than the set value Pset due to disturbance or the like. For example, when the pressure Ps in the suction chamber becomes higher than the set value Pset due to disturbance or the like, the pressure-sensitive element 124 contracts and the opening of the main valve portion 121c becomes smaller. Thus, the Pd-Pc flow path is narrowed, so that the amount of refrigerant under the discharge pressure Pd flowing from the discharge chamber to the crank chamber reduces and the pressure in the crank chamber decreases. As a result, the angle of inclination of the swash plate of the compressor becomes larger, and the discharge capacity of the compressor increases, causing the discharge pressure to decrease. On the other hand, when the pressure Ps in the suction chamber becomes lower than the set value Pset, the pressure-sensitive element 124 extends and the opening of the main valve portion 121c becomes larger. Thus, the Pd-Pc flow path is extended, so that the amount of refrigerant under the discharge pressure Pd flowing from the discharge chamber to the crank chamber increases, and the pressure in the crank chamber increases. As a result, the angle of inclination of the swash plate of the compressor becomes smaller, causing the discharge capacity of the compressor to reduce and causing the discharge pressure to increase. Thus, the capacity control valve 100 can control the pressure in the suction chamber of the variable capacity compressor so as to reach the set value Pset.

Next, when a liquid refrigerant (a refrigerant that has been liquefied by cooling while the compressor is inoperative) is accumulated in the crank chamber after the compressor is stopped for a long period of time, the operation of the capacity control valve 100 for discharging the liquid refrigerant will be described based on FIG. 5. During the liquid refrigerant discharge, the pressure in the third valve chest 116 communicating with the crank chamber becomes higher and the suction pressure Ps also becomes higher. Therefore, the pressure-sensitive element 124 contracts under the high-pressure suction pressure Ps so that the auxiliary valve portion 123d is brought into an open state. When the solenoid 130 is driven in the advancing direction, the main valve portion 121c is brought into the fully closed state, and the retaining ring 142 of the rod 136 presses the pressure-sensitive element 124 to forcibly open the auxiliary valve portion 123d, so that the auxiliary valve portion 123d is brought into the fully open state. The pressure-sensitive element 124 is pressed by the rod 136 so that the auxiliary valve portion 123d is kept in the fully open state. Therefore, the opening of the auxiliary valve portion 123d does not change from the start of the liquid refrigerant discharge to the completion of the liquid refrigerant discharge and can be kept in the fully open state, allowing the liquid refrigerant to be discharge from the crank chamber to the suction chamber thorough the Pc-Ps flow path in a short time. On the other hand, when the pressure-sensitive element 124 is not pressed by the rod 136 of the solenoid 130 to forcibly open the auxiliary valve portion 123d, as the discharge of the liquid refrigerant discharge progresses, the pressure in the third valve chest 116 and the suction pressure Ps decrease, so that the opening of the auxiliary valve portion 123d gradually becomes smaller, resulting in an increase in time to complete the discharge of the liquid refrigerant. Therefore, the preset discharge amount cannot be secured in a short time.

In addition, conventionally, during the liquid refrigerant discharge operation, attention has been focused only on how to complete the discharge of the liquid refrigerant in a short time, and the control for reducing the engine load in process of the liquid refrigerant discharge operation was not performed. Meanwhile, during the liquid refrigerant discharge, the auxiliary valve portion 123d is brought into the open state, so that no biasing force acts on the valve element 120 from the pressure-sensitive element 124, causing it difficult to quickly drive the valve element 120. The capacity control valve 100 according to the present invention enables can easily drive the valve element 120 even during the liquid refrigerant discharge.

The operation of the capacity control valve 100 for reducing the engine load during the liquid refrigerant discharge will be described with reference to FIG. 6. In order to reduce the engine load during the liquid refrigerant discharge, the solenoid 130 is turned off, and a magnetic attractive force Fsol between the core 132 and the plunger 135 is set to zero. At this time, since the upward pressure and the downward pressure acting on the valve element 120 are set to be balanced, the main force acting on the valve element 120 is the biasing force of the spring 137 and the spring 143. Additionally, the biasing force of the spring 137 is set to be larger than the biasing force of the spring 143. Therefore, the rod 136 is pushed up by the biasing force of the spring 137, the retaining ring 142 comes into contact with the adapter 123 so that the valve element 120 is driven, and the main valve portion 121c is fully opened. When the main valve portion 121c is fully opened, the amount of refrigerant flowing from the discharge chamber of the compressor to the crank chamber through the Pd-Pc flow path increases and the pressure Pc in the crank chamber increases, so that the compressor is operated with the minimum capacity. Thus, likewise during the liquid refrigerant discharge, even when the auxiliary valve portion 123d is in the open state and no force acts on the valve element 120 from the pressure-sensitive element 124, bringing the main valve portion 121c from the fully closed state into the fully open state enables the load on the compressor to be reduced, and thus enables the engine load to be reduced also during the liquid refrigerant discharge.

Furthermore, also in order to reduce the load on the engine in the control state in which the capacity control valve 100 controls the pressure in the suction chamber of the compressor so as to reach the set value Pset, as described above, by bringing the solenoid 130 into the non-energized state, the main valve portion 121c is brought into the fully open state to increase the amount of refrigerant under the pressure Pd flowing from the discharge chamber of the compressor to the crank chamber through the Pd-Pc flow path, allowing the compressor to operate with a minimum capacity and perform the operation for reducing the load on the engine.

Thus, the rod 136 moves integrally with the valve element 120 while the main valve portion 121c is brought from the fully open state into the fully closed state, and after the main valve portion 121c is fully closed, the rod 136 moves relative to the valve element 120 to press the sensitive element 124, allowing the auxiliary valve portion 123d to be opened. That is, one rod 136 can open and close the main valve portion 121c and the auxiliary valve portion 123d, which are different. In addition, since the spring constant of the spring 137 is set to be larger than the spring constant of the spring 143, and the biasing force of the spring 137 is larger than the biasing force of the spring 143, the opening and closing states of the main valve portion 121c and the auxiliary valve portion 123d can be opened and closed in any state. That is, the main valve portion 121c can be opened while the auxiliary valve portion 123d be opened, the main valve portion 121c can be opened while the auxiliary valve portion 123d be closed, while the main valve portion 121c can be closed the auxiliary valve portion 123d be opened, while the main valve portion 121c can be closed and the auxiliary valve portion 123d be closed.

Although the embodiments according to the present invention have been described using the drawings, their specific configuration is not limited to these embodiments. Any changes and additions made without departing from the scope of the present invention are included in the present invention.

For example, in the second embodiment, the spring 143 is arranged on the outer peripheral side of the main valve element 121 in the first valve chest 114, but is not limited thereto. For example, it may be arranged on the inner peripheral side of the main valve element 121 in the first valve chest 114 so that its one end is in contact with the core 132 and the other end is in contact with the valve element 120.

Furthermore, in the above embodiments, a first pressure in the first valve chest 14 (114) is the suction pressure Ps of the variable capacity compressor, a second pressure in the second valve chest 15 (115) is the discharge pressure Pd of the variable capacity compressor, and a third pressure in the third valve chest 16 (116) is the pressure Pc in the crank chamber of the variable capacity compressor, but is not limited to this. The first pressure in the first valve chest 14 (114) may be the pressure Pc in the crank chamber of the variable capacity compressor, the second pressure in the second valve chest 15 (115) be the discharge pressure Pd of the variable capacity compressor, and the third pressure in the third valve chest 16 (116) be the suction pressure Ps of the variable capacity compressor, so that the present invention can be applied to various variable capacity compressors.

REFERENCE SIGNS LIST 1 capacity control valve
10 valve body
11 first communication passage
12 second communication passage
13 third communication passage
14 first valve chest
15 second valve chest
15a main valve seat
16 third valve chest
17 valve hole
20 valve element
21 main valve element
21a shutoff valve portion
21c main valve portion
23 adapter
23d auxiliary valve portion
24 pressure-sensitive element
24a bellows
24d auxiliary valve seat
27 main valve
28 auxiliary valve
29 intermediate communication passage
30 solenoid unit
31 electromagnetic coil
32 core
33 solenoid case
35 plunger
36 rod
38 plunger case
41 spacer
42 retaining ring (locking portion)
43 spring (first biasing member)
44 spring (second biasing member)
100 capacity control valve
110 valve body 111 first communication passage
112 second communication passage
113 third communication passage
114 first valve chest
115 second valve chest
115a main valve seat
116 third valve chest
117 valve hole
120 valve element
121 main valve element
121a shutoff valve portion
121c main valve portion
123 adapter
123d auxiliary valve portion
124 pressure-sensitive element
124a bellows
124d auxiliary valve seat
127 main valve
128 auxiliary valve
129 intermediate communication passage
130 solenoid
131 electromagnetic coil
132 core
133 solenoid case
135 plunger
136 rod
137 spring (second biasing member)
138 plunger case
142 retaining ring (locking member)
143 spring (first biasing member)
Fsol magnetic attractive force
Ps suction pressure (first pressure) (third pressure)
Pd discharge pressure
Pc control chamber pressure (third pressure) (first pressure)
Pset suction pressure set value

The invention claimed is:

1. A capacity control valve that controls a flow rate or a pressure of a variable capacity compressor according to a valve opening of a valve unit, comprising:
a valve body including first communication passages configured to pass fluid under a first pressure, second communication passages that are arranged adjacent to the first communication passages and configured to pass fluid under a second pressure, third communication passages configured to pass fluid under a third pressure, and a main valve seat that is disposed in a valve hole communicating the second communication passages and the third communication passages;
a pressure-sensitive element that is arranged in the valve body on the side of the third communication passages and configured to extend and contract in response to an ambient pressure;
a valve element including an intermediate communication passage that communicates the first communication passages and the third communication passages, a main valve portion that is separated from and configured to come into contact with the main valve seat to open and close the valve hole, and an auxiliary valve portion that is separated from and configured to come into contact with the pressure-sensitive element to open and close the intermediate communication passage;
a solenoid configured to drive a rod;
a first biasing member configured to bias in a valve closing direction of the main valve portion; and
a second biasing member configured to bias in a valve opening direction of the main valve portion, wherein
the rod is configured to move relative to the valve element to press the pressure-sensitive element, wherein the solenoid further includes a plunger connected to the rod, a core arranged between the plunger and the valve body, and an electromagnetic coil, and
the second biasing member is disposed between the plunger and the core, wherein the rod includes a locking portion that is separated from and configured to come into contact with the valve element and that is separated from and configured to come into contact with the pressure-sensitive element.

2. The capacity control valve according to claim 1, wherein a biasing force of the second biasing member is larger than a biasing force of the first biasing member.

3. The capacity control valve according to claim 1, wherein the first biasing member is disposed between the solenoid and the valve element.

4. The capacity control valve according to claim 1, wherein the first pressure is a suction pressure of the variable capacity compressor, the second pressure is a discharge pressure of the variable capacity compressor, and the third pressure is a pressure in a crank chamber of the variable capacity compressor.

5. The capacity control valve according to claim 1, wherein the first pressure is a pressure in a crank chamber of the variable capacity compressor, the second pressure is a discharge pressure of the variable capacity compressor, and the third pressure is a suction pressure of the variable capacity compressor.

6. A method of controlling a capacity control valve, comprising
using the capacity control valve according to claim 1, when the auxiliary valve portion is in an open state, bringing the main valve portion from a closed state into an open state.

7. The capacity control valve according to claim 2, wherein the first biasing member is disposed between the solenoid and the valve element.

8. The capacity control valve according to claim 2, wherein the first pressure is a suction pressure of the variable capacity compressor, the second pressure is a discharge pressure of the variable capacity compressor, and the third pressure is a pressure in a crank chamber of the variable capacity compressor.

9. The capacity control valve according to claim 2, wherein the first pressure is a pressure in a crank chamber of the variable capacity compressor, the second pressure is a discharge pressure of the variable capacity compressor, and the third pressure is a suction pressure of the variable capacity compressor.

10. A method of controlling a capacity control valve comprising
using the capacity control valve according to claim 2, when the auxiliary valve portion is in an open state, bringing the main valve portion from a closed state into an open state.

11. A capacity control valve that controls a flow rate or a pressure of a variable capacity compressor according to a valve opening of a valve unit, comprising:
a valve body including first communication passages configured to pass fluid under a first pressure, second communication passages that are arranged adjacent to the first communication passages and configured to pass fluid under a second pressure, third communication passages configured to pass fluid under a third pressure, and a main valve seat that is disposed in a valve hole communicating the second communication passages and the third communication passages;

a pressure-sensitive element that is arranged in the valve body on the side of the third communication passages and configured to extend and contract in response to an ambient pressure;

a valve element including an intermediate communication passage that communicates the first communication passages and the third communication passages, a main valve portion that is separated from and configured to come into contact with the main valve seat to open and close the valve hole, and an auxiliary valve portion that is separated from and configured to come into contact with the pressure-sensitive element to open and close the intermediate communication passage;

a solenoid that drives a rod;

a first biasing member configured to bias in a valve closing direction of the main valve portion; and a second biasing member configured to bias in a valve opening direction of the main valve portion, wherein the rod configured to move relative to the valve element to press the pressure-sensitive element, wherein the solenoid further includes a plunger connected to the rod, a core arranged between the plunger and the valve body, and an electromagnetic coil, and the second biasing member is disposed between the plunger and the core, wherein the rod includes a locking portion that is separated from and configured to come into contact with the valve element, and the rod includes a pressing portion configured to press against the pressure-sensitive element.

12. The capacity control valve according to claim 11, wherein a biasing force of the second biasing member is larger than a biasing force of the first biasing member.

13. The capacity control valve according to claim 11, wherein the first biasing member is disposed between the solenoid and the valve element.

14. The capacity control valve according to claim 11, wherein the first pressure is a suction pressure of the variable capacity compressor, the second pressure is a discharge pressure of the variable capacity compressor, and the third pressure is a pressure in a crank chamber of the variable capacity compressor.

15. The capacity control valve according to claim 11, wherein the first pressure is a pressure in a crank chamber of the variable capacity compressor, the second pressure is a discharge pressure of the variable capacity compressor, and the third pressure is a suction pressure of the variable capacity compressor.

16. A method of controlling a capacity control valve, comprising using the capacity control valve according to claim 11, when the auxiliary valve portion is in an open state, bringing the main valve portion from a closed state into an open state.

* * * * *